US010717631B2

(12) United States Patent
Rudy et al.

(10) Patent No.: US 10,717,631 B2
(45) Date of Patent: Jul. 21, 2020

(54) OPTICAL DETECTION AND ANALYSIS OF CRANE HOIST AND ROPE

(71) Applicant: Manitowoc Crane Companies, LLC, Manitowoc, WI (US)

(72) Inventors: John R. Rudy, Greencastle, PA (US); Matthew Thoresen, Chambersburg, PA (US)

(73) Assignee: Manitowoc Crane Companies, LLC, Milwaukee, WI (US)

( * ) Notice: Subject to any disclaimer, the term of this patent is extended or adjusted under 35 U.S.C. 154(b) by 115 days.

(21) Appl. No.: 15/819,171

(22) Filed: Nov. 21, 2017

(65) Prior Publication Data

US 2018/0141787 A1    May 24, 2018

Related U.S. Application Data

(60) Provisional application No. 62/425,449, filed on Nov. 22, 2016.

(51) Int. Cl.
*G06K 9/00* (2006.01)
*B66C 13/16* (2006.01)
(Continued)

(52) U.S. Cl.
CPC .............. *B66C 13/16* (2013.01); *B66C 13/18* (2013.01); *B66C 13/46* (2013.01); *B66C 13/48* (2013.01);
(Continued)

(58) Field of Classification Search
CPC ......... B66C 13/06; B66C 13/16; B66C 13/18; B66C 13/46; B66C 13/48; B66C 15/06;
(Continued)

(56) References Cited

U.S. PATENT DOCUMENTS

| 4,216,868 A | 8/1980 | Geppert |
| 4,577,344 A | 3/1986 | Warren et al. |

(Continued)

FOREIGN PATENT DOCUMENTS

| AU | 637377 B | 10/1993 |
| AU | 2015372216 A1 | 7/2016 |

(Continued)

OTHER PUBLICATIONS

Vallan A, Molinari F. A vision-based technique for lay length measurement of metallic wire ropes. IEEE Trans Instrum Meas 2009: 58. (Year: 2009).*

(Continued)

*Primary Examiner* — Ian L Lemieux
(74) *Attorney, Agent, or Firm* — Levenfeld Pearlstein, LLC

(57) ABSTRACT

A crane includes a carrier and a superstructure. A hoist is coupled to the superstructure and includes a hoist drum and a rope. The crane further includes an optical detection system. The optical detection system includes an image capture assembly having an image capture device configured to capture an image of the hoist, and an optical control system configured to detect an object in the captured image, the object selected from: the rope, the hoist drum, a wrap of rope on the hoist drum and a marker on the hoist. The optical control system is configured to analyze the detected objects and determine a condition of a crane component based on the analysis. A method of determining a condition of a crane component includes capturing an image, detecting the objects in the image, analyzing the detected objects and determining a condition of the crane component based on the analysis.

18 Claims, 13 Drawing Sheets

(51) Int. Cl.

| | | |
|---|---|---|
| *B66C 23/36* | (2006.01) | |
| *B66C 15/06* | (2006.01) | |
| *G06T 7/00* | (2017.01) | |
| *G06T 7/73* | (2017.01) | |
| *G06T 7/13* | (2017.01) | |
| *B66C 13/46* | (2006.01) | |
| *B66C 13/18* | (2006.01) | |
| *G06T 7/60* | (2017.01) | |
| *G06T 7/70* | (2017.01) | |
| *G01B 11/26* | (2006.01) | |
| *B66C 13/48* | (2006.01) | |
| *B66C 23/42* | (2006.01) | |
| *B66C 13/06* | (2006.01) | |

(52) U.S. Cl.
CPC ............ *B66C 15/06* (2013.01); *B66C 15/065* (2013.01); *B66C 23/36* (2013.01); *B66C 23/42* (2013.01); *G01B 11/26* (2013.01); *G06T 7/0004* (2013.01); *G06T 7/13* (2017.01); *G06T 7/60* (2013.01); *G06T 7/70* (2017.01); *G06T 7/74* (2017.01); *B66C 13/06* (2013.01); *G06T 2207/30164* (2013.01); *G06T 2207/30204* (2013.01); *G06T 2207/30242* (2013.01)

(58) Field of Classification Search
CPC ....... B66C 15/065; B66C 23/36; B66C 23/42; G01B 11/26; G06T 2207/30164; G06T 2207/30204; G06T 2207/20242; G06T 7/0004; G06T 7/13; G06T 7/60; G06T 7/70; G06T 7/74
See application file for complete search history.

(56) References Cited

U.S. PATENT DOCUMENTS

| | | |
|---|---|---|
| 4,826,391 A | 5/1989 | Lawrence et al. |
| 4,907,768 A | 3/1990 | Masseron et al. |
| 5,170,681 A | 12/1992 | Kemp |
| 5,182,843 A | 2/1993 | Umetsu et al. |
| 5,251,768 A | 10/1993 | Yoshimatsu et al. |
| 5,392,935 A | 2/1995 | Kazama et al. |
| 5,642,822 A | 7/1997 | Monzen et al. |
| 5,645,181 A | 7/1997 | Ichiba et al. |
| 5,726,907 A | 5/1998 | Davidson et al. |
| 5,967,347 A | 10/1999 | Miyata et al. |
| 6,065,619 A | 5/2000 | Miyata et al. |
| 6,140,930 A | 10/2000 | Shaw |
| 6,256,553 B1 | 7/2001 | Erikkila |
| 6,554,144 B2 | 4/2003 | Hashiguchi et al. |
| 6,568,547 B1 | 5/2003 | Kretschmer et al. |
| 6,588,610 B2 | 7/2003 | Ong et al. |
| 6,634,112 B2 | 10/2003 | Carr et al. |
| 6,718,048 B1 | 4/2004 | Kawata et al. |
| 6,748,104 B1 | 6/2004 | Bachelder et al. |
| 6,765,224 B1 | 7/2004 | Favreau et al. |
| 6,894,621 B2 | 5/2005 | Shaw |
| 7,106,883 B2 | 9/2006 | Uchida et al. |
| 7,121,012 B2 | 10/2006 | Voecks |
| 7,289,875 B2 | 10/2007 | Recktenwald et al. |
| 7,289,876 B2 | 10/2007 | Lussen et al. |
| 7,310,431 B2 | 12/2007 | Gokturk et al. |
| 7,472,009 B2 | 12/2008 | Baldwin |
| 7,599,762 B2 | 10/2009 | Discenzo et al. |
| 7,648,036 B2 | 1/2010 | Recktenwald et al. |
| 7,656,459 B2 | 2/2010 | Catanzaro |
| 7,936,143 B2 | 5/2011 | Ikeguchi et al. |
| 7,950,539 B2 | 5/2011 | Henriksson |
| 8,005,598 B2 | 8/2011 | Terashima et al. |
| 8,267,264 B2 | 9/2012 | Bryfors et al. |
| 8,272,521 B1 | 9/2012 | Kemmerly et al. |
| 8,385,594 B2 | 2/2013 | Hofmann et al. |
| 8,504,253 B2 | 8/2013 | Stantchev et al. |
| 8,618,949 B2 | 12/2013 | Maynard et al. |
| 8,659,408 B2 | 2/2014 | Taylor et al. |
| 8,682,541 B2 | 3/2014 | Best et al. |
| 8,937,651 B2 | 1/2015 | Guissin et al. |
| 9,156,663 B2 | 10/2015 | Roeben et al. |
| 9,278,834 B2 | 3/2016 | Pech et al. |
| 9,300,954 B2 | 3/2016 | Tanizumi et al. |
| 9,335,318 B2 * | 5/2016 | Ilaka .................. B66C 13/16 |
| 9,394,146 B2 | 7/2016 | Schroder |
| 9,440,824 B2 | 9/2016 | Stuehrwoldt et al. |
| 9,556,006 B2 | 1/2017 | Schneider et al. |
| 2003/0137590 A1 | 7/2003 | Barnes et al. |
| 2003/0161524 A1 | 8/2003 | King |
| 2005/0192732 A1* | 9/2005 | Narisawa ............ B66C 23/905 |
| | | 701/50 |
| 2005/0226584 A1 | 10/2005 | Williams et al. |
| 2005/0232626 A1 | 10/2005 | Schulte et al. |
| 2010/0070179 A1 | 3/2010 | Cameron |
| 2010/0189226 A1 | 7/2010 | Kotowski et al. |
| 2010/0277298 A1 | 11/2010 | Leong et al. |
| 2011/0031202 A1 | 2/2011 | Pech et al. |
| 2011/0140419 A1 | 6/2011 | Stockner |
| 2011/0187548 A1 | 8/2011 | Maynard et al. |
| 2011/0272376 A1 | 11/2011 | Jung et al. |
| 2013/0013251 A1 | 1/2013 | Schoonmaker et al. |
| 2013/0119256 A1 | 5/2013 | Husmann et al. |
| 2013/0345857 A1 | 12/2013 | Lee et al. |
| 2014/0224755 A1 | 8/2014 | Eriksson et al. |
| 2015/0122761 A1 | 5/2015 | Ford et al. |
| 2015/0130375 A1 | 5/2015 | Sutherland |
| 2015/0142277 A1 | 5/2015 | Eriksson et al. |
| 2015/0217455 A1 | 8/2015 | Kikkeri et al. |
| 2015/0226369 A1 | 8/2015 | Troy et al. |
| 2015/0256797 A1* | 9/2015 | Torben .................. B66D 1/36 |
| | | 348/46 |
| 2015/0329333 A1* | 11/2015 | Fenker ................ B66C 13/46 |
| | | 212/225 |
| 2015/0344271 A1 | 12/2015 | Schneider et al. |
| 2016/0006947 A1 | 1/2016 | Kowatari et al. |
| 2016/0016763 A1 | 1/2016 | Lee et al. |
| 2016/0031681 A1 | 2/2016 | Delplace |
| 2016/0031683 A1 | 2/2016 | Fenker et al. |
| 2016/0035251 A1 | 2/2016 | Delplace |
| 2016/0107866 A1 | 4/2016 | Schoonmaker et al. |
| 2016/0119589 A1 | 4/2016 | Tanizumi et al. |
| 2016/0176686 A1 | 6/2016 | Schoonmaker |
| 2016/0236913 A1 | 8/2016 | Ilaka et al. |
| 2017/0217737 A1 | 8/2017 | Rudy et al. |
| 2018/0072540 A1 | 3/2018 | Stangl |
| 2018/0141787 A1 | 5/2018 | Rudy et al. |
| 2018/0141789 A1 | 5/2018 | Rudy et al. |
| 2018/0143011 A1 | 5/2018 | Rudy et al. |
| 2018/0209156 A1 | 7/2018 | Pettersson |
| 2018/0252921 A1 | 9/2018 | Rantala et al. |
| 2019/0112165 A1 | 4/2019 | Palberg et al. |
| 2019/0270624 A1 | 9/2019 | Sembo |
| 2019/0276281 A1 | 9/2019 | Hofmeister et al. |

FOREIGN PATENT DOCUMENTS

| | | |
|---|---|---|
| CN | 2154484 Y | 1/1994 |
| CN | 102193559 A | 9/2011 |
| CN | 102661952 A | 9/2012 |
| CN | 102795547 A | 11/2012 |
| CN | 203319435 U | 12/2013 |
| CN | 102756976 B | 7/2014 |
| CN | 104477723 A | 4/2015 |
| CN | 104535356 A | 4/2015 |
| DE | 102006046469 A1 | 4/2008 |
| DE | 102013008348 A1 | 11/2014 |
| DE | 102014018063 A1 | 6/2016 |
| EP | 2383566 A1 | 11/2011 |
| EP | 2722302 A1 | 4/2014 |
| EP | 2914540 B1 | 9/2015 |
| EP | 2899496 A1 | 8/2016 |
| JP | 2056397 A | 2/1990 |
| JP | H0256397 A | 2/1990 |
| JP | 2003300692 A | 10/2003 |
| JP | 2008074594 A | 4/2008 |

(56) References Cited

FOREIGN PATENT DOCUMENTS

| | | | |
|---|---|---|---|
| JP | 2009073248 A | 4/2009 | |
| JP | 2010241548 A | 10/2010 | |
| JP | 2013120176 A | 6/2013 | |
| JP | 2013193825 A | 9/2013 | |
| JP | 2015229582 A | 12/2015 | |
| JP | 2016166086 A | 9/2016 | |
| JP | 2016166091 A | 9/2016 | |
| JP | 2017186163 A | 10/2017 | |
| JP | 2017186164 A | 10/2017 | |
| JP | 2017186165 A | 10/2017 | |
| WO | 9119665 A1 | 2/1991 | |
| WO | 1999008956 A1 | 2/1999 | |
| WO | 2004080882 A1 | 9/2004 | |
| WO | 2009047719 A2 | 4/2009 | |
| WO | 2013059599 A1 | 4/2013 | |
| WO | 2014019132 A1 | 2/2014 | |
| WO | 2014047840 A1 | 4/2014 | |
| WO | 2016101500 A1 | 6/2016 | |
| WO | 2017067651 A1 | 4/2017 | |
| WO | 2017159321 A1 | 9/2017 | |

OTHER PUBLICATIONS

Extended European Search Report issued by EPO in connection with EP17203098 dated Apr. 17, 2018.
Extended European Search Report issued by EPO in connection with EP17203102 dated Apr. 18, 2018.
Extended European Search Report issued by EPO in connection with EP17203093 dated Apr. 18, 2018.
Extended European Search Report issued by EPO in connection with EP17203109 dated May 4, 2018.
European Search Report issued by ISA/EPO in connection with EP17153446 dated Jul. 7, 2017.
"360 degree vehicle camera systems", https://www.vdo-instruments.com/camera-systems/360-degree-vehicle-camera-systems.html, captured Oct. 9, 2017.
"ProViu ASL 360", http://www.asl360.co.uk/products/, captured Oct. 9, 2017.

* cited by examiner

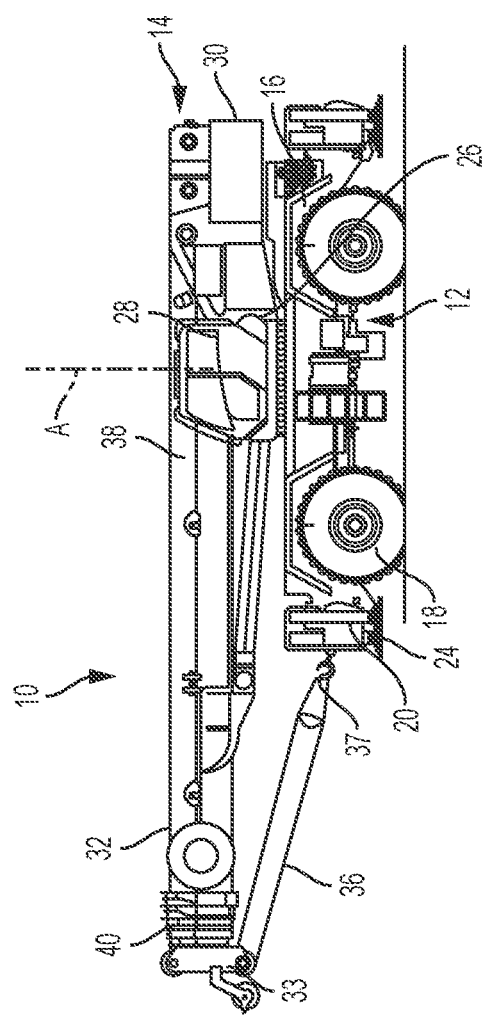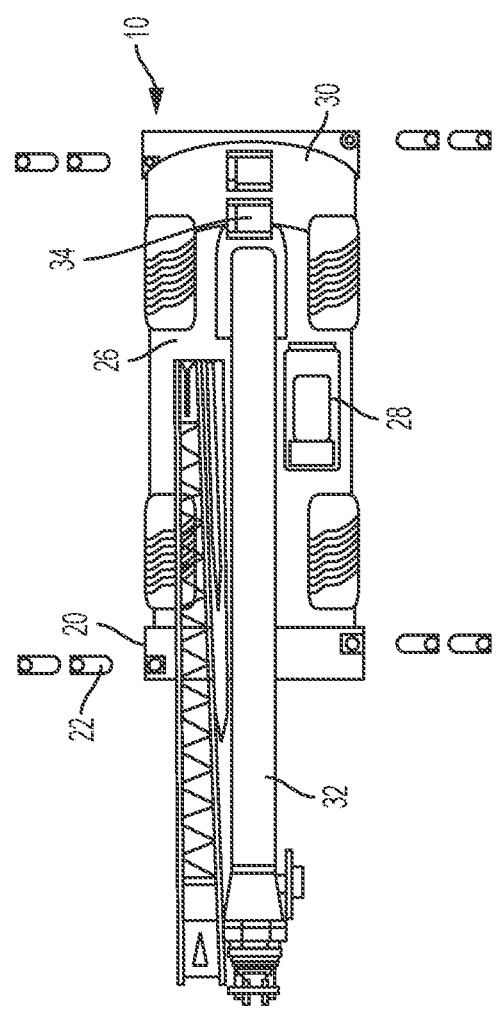

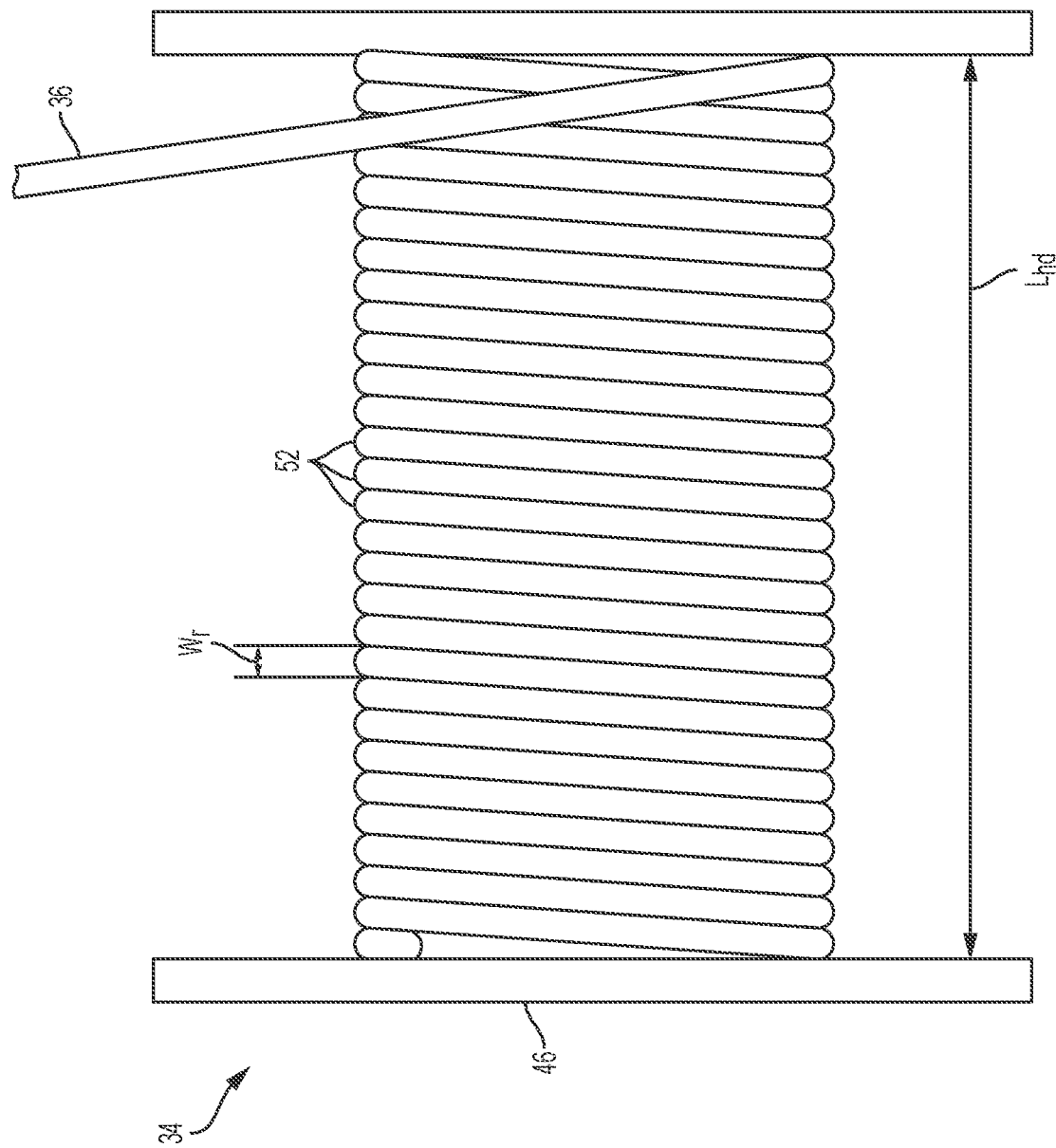

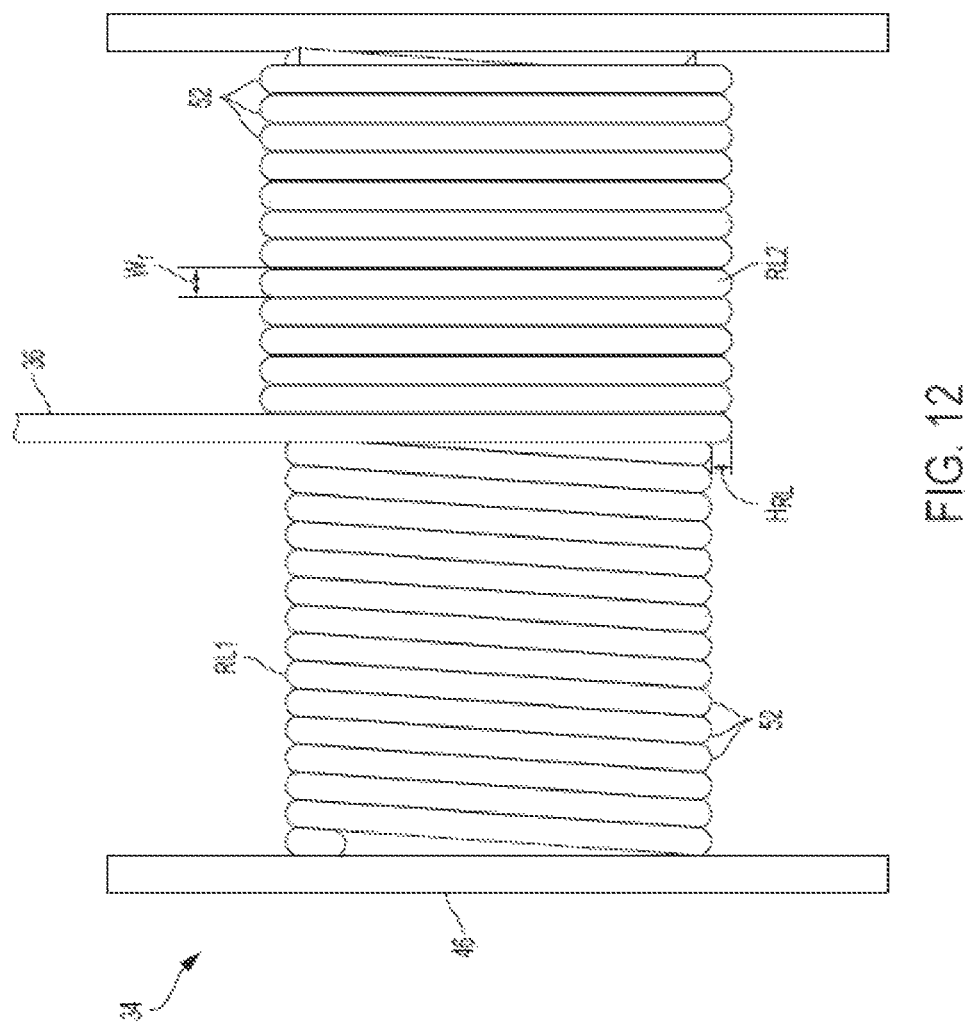

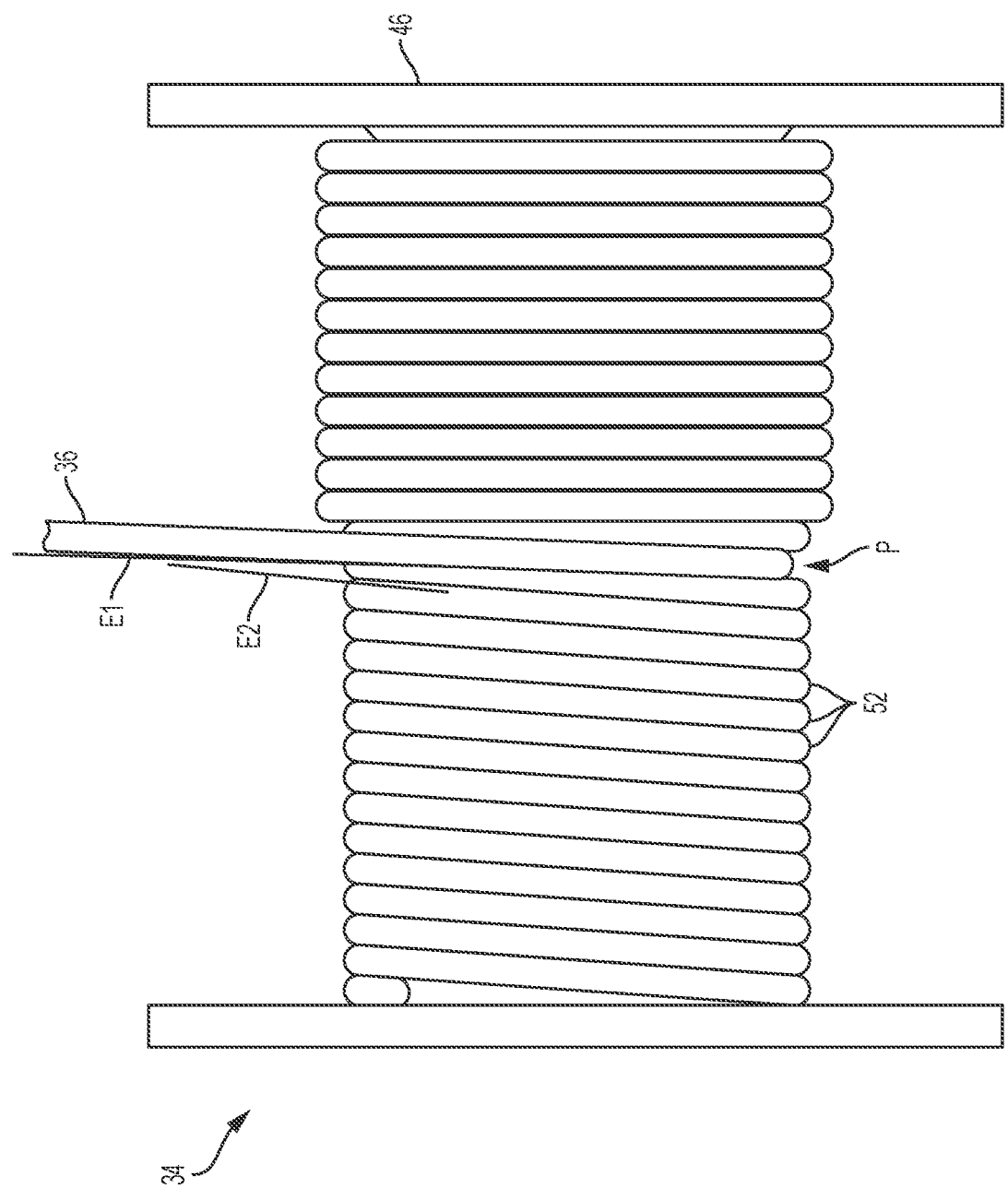

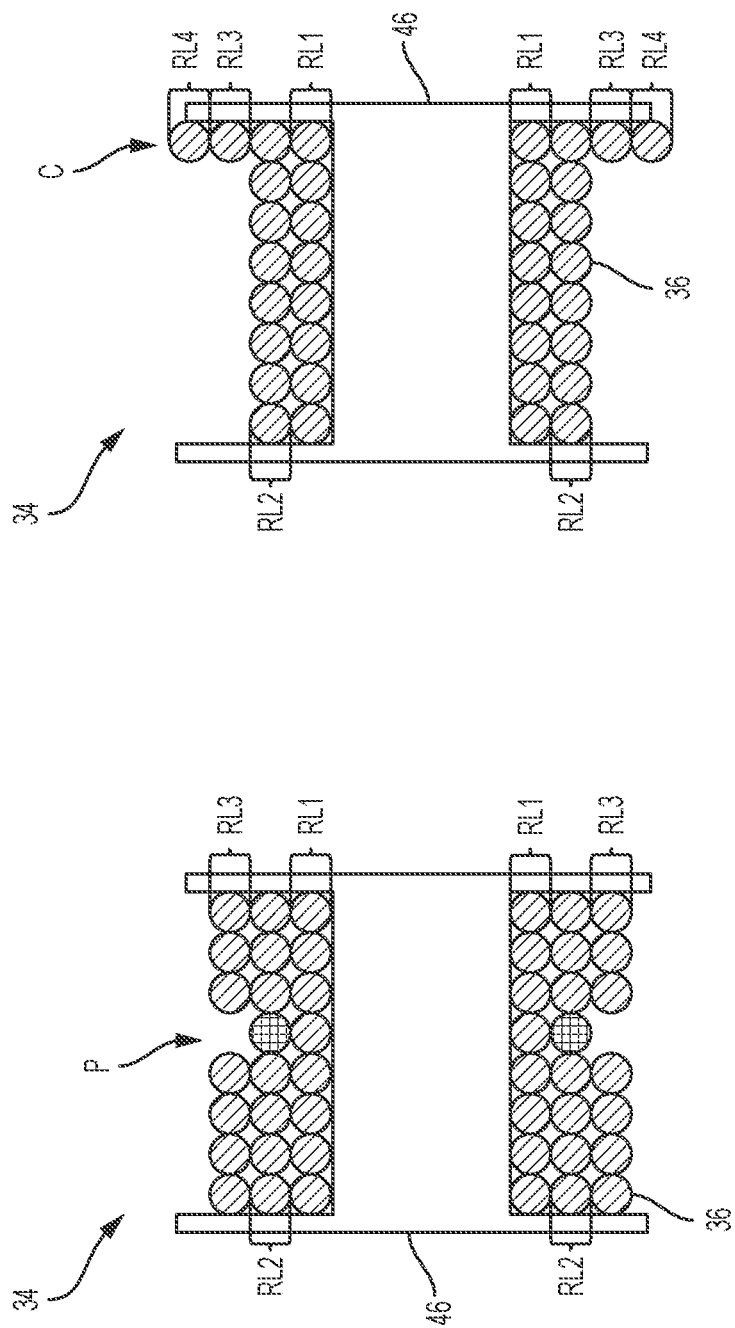

OPTICAL DETECTION AND ANALYSIS OF CRANE HOIST AND ROPE

BACKGROUND

The following description relates to the detection and analysis of a hoist, rope or both, and in particular, the optical detection and analysis of the hoist, rope or both on a crane.

A crane, such as a mobile crane, typically includes a lower works, or carrier, and an upper works, or superstructure, mounted on the lower works. The lower works includes, for example, a frame, a suspension mounted to the frame, tires mounted to the suspension, and one or more outriggers each having an arm selectively extendable and retractable in a substantially horizontal direction and a jack coupled to the arm selectively extendable and retractable in a substantially vertical direction. The upper works may be rotatably mounted on the lower works to rotate about a vertical axis. The upper works may include, for example, a boom, an operator cab, a counterweight and a hoist for winding and unwinding a rope. The upper works also includes a rotating bed on which the above-noted components are mounted. The hoist is typically mounted at or near a base of the upper works, such as the rotating bed. The rope may extend outward from the hoist, generally along the boom, and hang freely from the tip of the boom. A hook block is typically disposed at a free end of the rope for engaging a load.

The crane is capable of performing a number of movements. For example, the upper works, including the boom, may swing left or swing right (i.e., rotate on the vertical axis counterclockwise or clockwise), the boom may lift up or down (i.e., increase or decrease an angle relative to the horizontal), and the boom may extend or retract telescopically. In addition, the hoist may operate to unwind the rope such that a length of the rope extending from the boom tip increases, or wind the rope such that a length of the rope extending from the boom tip decreases. Winding of the rope may correspond to lifting the load and unwinding the rope may correspond to lowering the load.

Various crane components, including those described above, may be monitored to determine a status of the crane component. Typically, sensors such as proximity sensors, load cells, RFID sensors and the like may be used to detect a crane component. For example, a proximity sensor may detect whether an outrigger is in a fully extended or retracted condition or whether a counterweight is properly positioned condition. Other sensors, such as position sensors or laser distance sensors, may detect a hook block and a boom tip, such that a distance between the hook block the boom tip may be determined. Accordingly, a two-blocking condition may be determined. Further, load cells may detect a load on an outrigger jack. Subsequently, it may be determined whether the outrigger jack is in a deployed condition. Some crane components may be visually detected as well, for example, by the operator or a spotter.

Crane components may also be monitored to determine a service condition and whether a particular component needs to be replaced, repaired or otherwise maintained. Such monitoring may take place at predetermined time intervals or at a predetermined number of service hours. This monitoring may be carried out, for example, by visual inspection of the components.

A particular crane component that requires monitoring is the hoist and rope system. For example, a rope may begin to fray over time or may be damaged in the course of use. In addition, several rope conditions may occur on the hoist as a result of winding or unwinding which may adversely affect crane operations.

Currently, hoist and rope conditions may be monitored visually by an operator, spotter or service technician. The hoist and rope can be monitored both during use of the crane, in between uses, or at predetermined intervals, for example, at scheduled service inspections. Alternatively, some hoist and rope conditions may be monitored using a camera based monitoring system. For example, CN 00010435356 discloses a camera based system for monitoring a rope wound on a hoist drum, to determine if individual rope wraps are parallel and if the wraps are a correct distance apart.

However, manual or visual inspection of the hoist and/or rope may be time consuming, costly, and may be subjective depending on the viewer. In addition, intermittent or regularly scheduled inspections may fail to timely identify a service condition of a component which may affect crane operations. Further, existing camera-based monitoring systems are limited to detecting only certain components and determining relatively few conditions. For example, such systems may detect the rope only while on the hoist, and thus, are limited in the number and types of conditions which may be determined.

Accordingly, it is desirable to provide an image-based hoist and rope detection and analysis system capable of detecting and determining an increased number of conditions as well as other crane conditions based on the analysis of a captured image in which hoist and/or rope are detected.

SUMMARY

According to one aspect, a crane includes a carrier and a superstructure coupled to the carrier, the superstructure including a boom. A hoist is coupled to the superstructure, and includes a hoist drum and a rope configured to be wound and unwound on the hoist drum. The crane also includes an optical detection system having an image capture assembly including one or more image capture devices configured to capture an image of the hoist. The optical detection system further includes and an optical control system configured to detect one or more objects in the captured image, the one or more objects selected from: the rope, the hoist drum, a wrap of rope on the hoist drum and a marker on the hoist. The optical control system is also configured to analyze the one or more detected objects, and determine a condition of a crane component based on the analysis of the one or more detected objects.

According to another aspect, an optical detection system for a crane having a hoist including a hoist drum and a rope configured to be wound and unwound around the hoist drum includes an image capture assembly having one or more image capture devices configured to capture an image of the hoist, and an optical control system. The optical control system is configured to detect one or more objects in the captured image, the one or more objects selected from: the rope, the hoist drum, a wrap of rope on the hoist drum and a marker on the hoist. The optical control system is also configured to analyze the one or more detected objects and determine a condition of a crane component based on the analysis of the one or more detected objects.

According to another aspect, a method of determining a condition of a crane component includes capturing, with an image capture assembly, an image of a hoist on a crane, and detecting, with an optical control system, one or more objects in the captured image, wherein the one or more objects include: the hoist, a hoist drum, a rope configured to be wound or unwound on the hoist drum, and one or more wraps of the rope on the hoist drum. The method further includes analyzing, with the optical control system, the detected objects and determining, with the optical control system, a condition of a crane component based on the analysis of the detected objects.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 1 is a side view of a crane according to an embodiment;

FIG. 2 is a top view of the crane of FIG. 1;

FIG. 7 is a front view of a hoist having a rope in a condition according to an embodiment;

FIG. 12 is a front view of a hoist having a rope in another condition according to an embodiment;

FIG. 14 is a front view of a hoist having a rope in another condition according to an embodiment;

FIG. 15 is a cross-section of a hoist having a rope in another condition according to an embodiment;

FIG. 16 is a cross-section of a hoist having a rope in another condition according to an embodiment;

DETAILED DESCRIPTION

Figure 3:
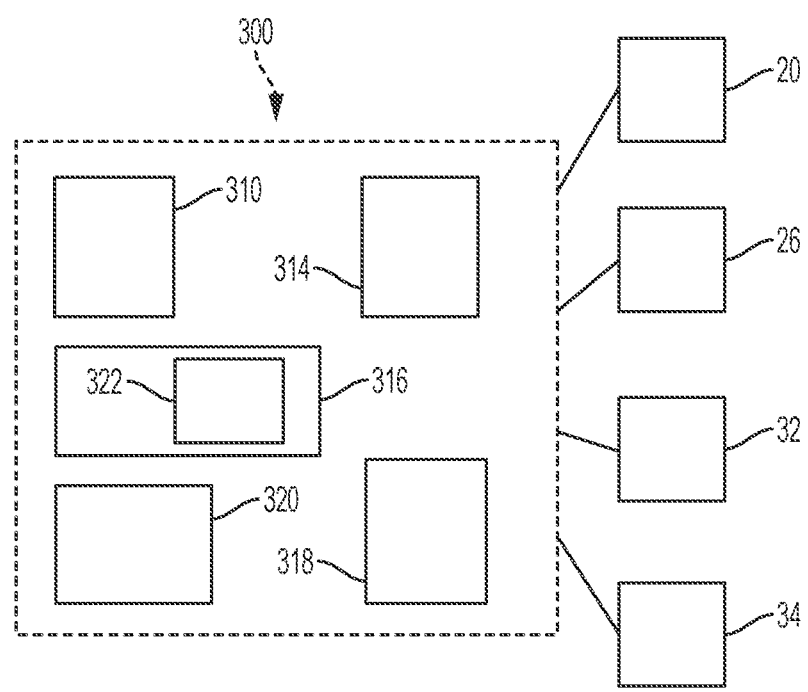
FIG. 3 is a block diagram of a crane control system according to an embodiment.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 is a side view of a crane 10 according to an embodiment described herein and FIG. 2 is a top view of the crane 10 in FIG. 1. Referring to FIGS. 1 and 2, the crane 10 may be a mobile crane, such as, but not limited to, a rough terrain crane, an all terrain crane, a truck mounted crane or an industrial crane. The crane 10 generally includes a carrier, or lower works, 12 and a superstructure, or upper works, 14.

In one embodiment, the carrier 12 may include various crane components, for example, a frame 16, a plurality of ground engaging elements 18 such as tires, and a suspension (not shown) interconnected between the frame 16 and the ground engaging elements 18. The carrier 12 may also include other crane components such as one or more outrigger assemblies 20. In one embodiment, each outrigger assembly 20 includes a jack 22 that is movable generally in a vertical direction to engage and disengage the ground or other support surface. Each outrigger assembly 20 may also include an arm 24 that is movable generally in a horizontal direction to extend toward and away from the frame 16. In one embodiment, the arm 24 is a telescoping arm having a fixed section, such as an outrigger box, and one or more telescoping sections movable relative to the fixed section. Each jack 22 may be mounted to a respective arm 24.

The superstructure 14 is coupled to the carrier 12. In one embodiment, the superstructure 14 is rotatably coupled to the carrier 12 and is configured to rotate relative to the carrier 12 about a vertical axis 'A'. In one embodiment, the superstructure 14 may also include crane components, for example, a rotating bed 26, an operator cab 28, a counterweight assembly 30, a boom 32, a hoist 34 for winding and unwinding a rope 36 (see FIGS. 5-17) and a hook block 37 connected to the rope 36. It is understood that the rope referred to herein includes metal cables, synthetic ropes, cords and other flexible members suitable for winding and unwinding on a hoist and for use with lifting equipment, such as the crane 10 described herein.

In one embodiment, the boom 32 may be a telescoping boom, such as a hydraulic telescoping boom. The boom 32 may include a base section 38 and one or more nested, telescoping sections 40 configured for telescoping extension and retraction relative to the base section 38. The one ore more telescoping sections 40 may be driven, for example, by a linear actuator (not shown). The rope 36 may extend from the hoist 34 generally along the boom 32, and extend from a boom tip 33. The hook block 37 is connected to the rope 36 at a distal end of the rope 36, opposite to the hoist 34.

It is understood that present disclosure is not limited to mobile cranes of the type described above. For example, the crane 10 may be a crawler crane, a tower crane or other lifting device using a hoist having a rope wound thereon. For example, in a tower crane, the lower works, or carrier may be in the form of a tower, and the upper works, or superstructure, may be coupled to the top of the tower. The boom may be formed as a jib on the superstructure. The hoist may be secured to the superstructure and the rope may extend along the jib. In some tower cranes, the rope may be connected to a trolley movable along the jib. It is also understood that although the hoist 34 is referred to herein in the singular, the present disclosure is not limited to cranes having only a single hoist. For example, dual hoist and continuous rope systems are envisioned as well.

Referring to FIG. 3, the crane 10 may also include a crane control system 300. The CCS may include one or more input devices 310, such as an operating knob, lever, switch, touch screen input, and the like, configured to receive an input from an operator. The input device 310 is operably connected to an actuator (not shown) configured to control movement of a crane component in response to an input received at the input device 310. For example, the input device 310 may receive an input to control slewing movement of the boom 32 and rotating bed 26, lifting (luffing) movement of the boom 32, telescoping movement (extension/retraction) of the boom 32, winding or winding of the rope 36 on the hoist 34, or movement of an outrigger assembly 20. In response to receiving the input, the actuator (not shown) may be actuated to control movement of the boom 32, hoist 34, outrigger 20 or other crane component in the desired manner. The actuator may be, for example, a linear actuator, rotary actuator, drive motor and other suitable actuators known to those having skill in the art.

In one embodiment, the crane control system 300 may include a computer processor 314, computer readable storage medium 316, a user interface 318 which may include the one or more input devices 310, and a communications interface 320. The crane control system 300 may be located in the cab 28 or remote from the cab 28. In some embodiments, components of the crane control system 300 may be distributed in different sections of the crane 10 or on devices remote from the crane 10. The computer readable storage medium 316 is operably coupled to the computer processor 314 such that it is able to communicate with the computer processor 314. The computer readable storage medium 316 stores instructions 322 that, when executed by the computer processor 314, cause the computer processor 314 to generate one or more signals to implement, or perform, functions. The computer readable storage medium 316 may also store information related to the operation of the crane 10. The user interface 318 is operably coupled to the computer processor 314 such that an operator is able to interact with computer processor 314. For example, through the user interface 318 the operator may obtain information related to the crane 10 operation and cause the computer processor 314 to generate one or more signals to implement a function. The operator may also input information to the user interface 314 or the one or more input devices 310 to cause the computer processor 314 to generate and transmit a control signal, via the communications interface 320, to the one or more of the actuators (not shown) to control or prevent movement of a crane component. In one embodiment, the instructions 322 stored at the computer readable storage medium 316 may be executed by the computer processor 314 in response to receipt of the input information from the user interface 318 such that a function is implemented by the computer processor 314 to transform the input information into the control signal.

Figure 4:
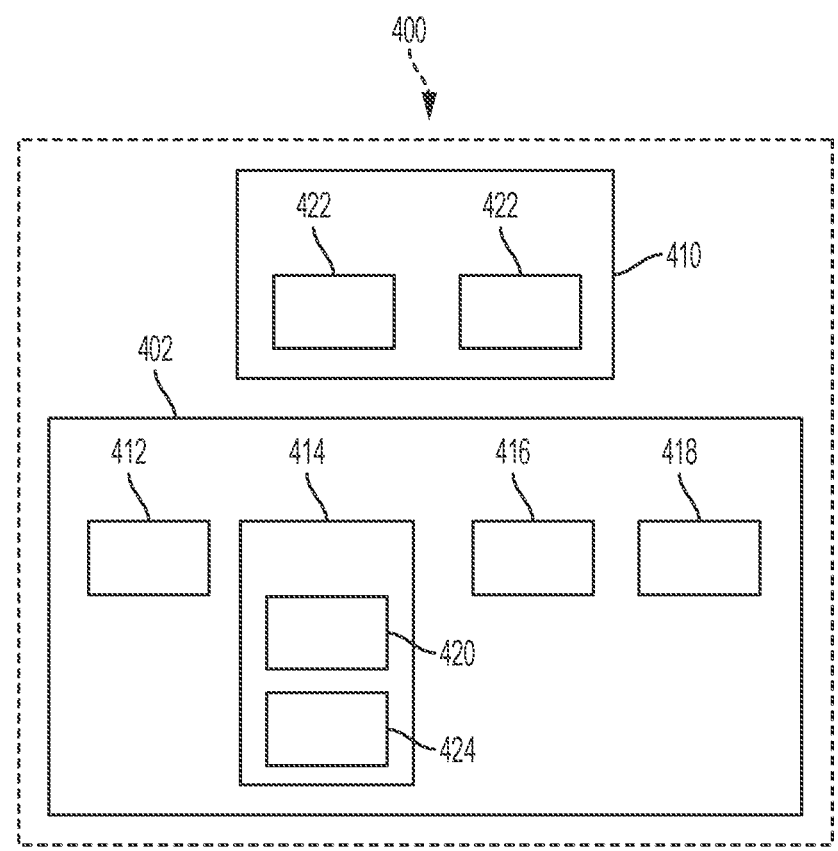
FIG. 4 is a block diagram of an optical detection system according to an embodiment.

Referring to FIG. 4, the crane 10 also includes an optical detection system 400. In one embodiment, the optical detection system 400 includes one or more image capture assemblies 410 and an optical control system 402 operably and communicably connected to the one or more image capture assemblies 410. The optical control system 402 includes a computer processor 412, a computer readable storage medium 414 and a communications interface 416, similar to those described above with respect to the crane control system 300. The optical control system 402 optionally includes a user interface 418, as well. The computer readable storage medium 414 stores instructions 420 that, when executed by the computer processor 412, cause the computer processor 412 to generate one or more signals to implement one or more functions. Alternatively, or in addition, the optical detection system 400 may be operably and communicably coupled to the crane control system 300, such that the optical detection system 400 and the crane control system 300 share one or more of a common computer processor, computer readable storage medium, user interface, and communications interface. In one embodiment, the optical control system 402 and the crane control system 300 may be one and the same. In one embodiment, components of the optical detection system 400 may be co-located with individual image capture assemblies 410, be located in a centralized location and communicably connected to the image capture assemblies 410 over a conventional communication interface, or be distributed among both.

Although certain processes, methods, analyses, calculations and/or determinations described herein may be referred as being carried out at one of the crane control system 300 or the optical detection system 400 (including the optical control system 402), it is understood that the present embodiments are not limited to these configurations. That is, the processes, methods, analyses, calculations and/or determinations described herein may, in some embodiments, be carried out interchangeably between, i.e., by either one of or both, the crane control system 300 and the optical detection system 400, even if a particular process, method, analysis, calculation or determination is not expressly described as such herein. Similarly, it is also understood that information, such as component specifications, sensor data and the like may be interchangeably input into either the crane control system 300 or the optical detection system 400.

For the purposes of consistency and understanding, the various methods, processes, analyses, calculations or determinations, as well as the input of various data or information, may be described herein as being carried out by, or input to, the optical detection system 400 or optical control system 402. However, as detailed above, the optical control system 400 and the crane control system 300 may share resources or components, operate interchangeably, or be one and the same. Accordingly, it is understood that the description herein of the methods, processes, analyses, calculations, determinations, including the input of data or information, being carried out by or input into the optical detection system 400 or optical control system 402, includes such processes, methods, analyses, calculations, determinations, or input of data or information, being carried out by or input to, the crane control system 300 as well.

In one embodiment, the one or more image capture assemblies 410 may be mounted, for example, on the superstructure 14, the carrier 12, or both. Suitable locations on the superstructure 14 for mounting the one or more image capture assemblies 410 include, but are not limited to, the rotating cab 26, the cab 28, the boom 32, the counterweight 30, or other intermediate or connecting structures between these components. Each image capture assembly 410 may include one or more image capture devices 422 configured for capturing an image across a desired field of view. In one embodiment, an image capture device 422 may be a camera, such as a digital camera, video camera, and/or a stereo camera, a LiDAR sensor, a visible light camera, an ultraviolet (UV) camera, an infrared (IR) camera, and other suitable devices capable of capturing an image for object recognition. For example, in one embodiment, the image capture assembly 410 may be a single camera, such as a wide angle camera, or alternatively, a combination of cameras working in conjunction with one another to capture an image or images across the field of view.

The optical detection system 400 is configured to capture an image of one or more crane components, detect one or more crane components or other objects captured in the image, analyze the detected objects and determine a status or condition of the crane component, a crane system, a crane or a series of cranes based on the captured image. The crane control system 300 may then alert the operator other personnel to the determined status or condition and carry out crane control functions in response to the determined status. The alert may be provided, for example, as an audio, visual, or tactile (including vibratory) signal or alarm to the operator. Alternatively, or in addition, to carry out crane control functions, the crane control system 300 may generate a control signal to control an actuator, and in turn, movement of a desired crane components, based on the determined status or condition.

The status or condition could be, for example, an absolute position, a relative position, movement, existence, speed, acceleration, dimensions, and length of extension or retraction of a crane component. Other statuses include, for example, the type of component and a physical configuration of the component. Further, the status could be a service condition of the crane component, which may include, for example, indications of wear, damage or need for maintenance, repair or replacement of the component. It is understood that these examples are not exhaustive and the determination of other conditions are envisioned.

The optical detection system 400 may detect a crane component, and in some embodiments, determine a status of the crane component, using one or more detection methods, including but not limited to, one or more object recognition techniques. In some embodiments, the optical detection system 400 may analyze an image captured by the image capture assembly 410 to optically detect a crane component using optical recognition algorithms such as edge detection using brightness discontinuities. The optical recognition algorithms may be stored in the memory 414 and/or executed by the computer processor 412 at, for example, the optical control system 402 of the optical detection system 400. The optical detection system 400 may detect an edge or an end of a crane component using the above-noted edge detection and then, to determine a status, look up a position of the component based on the pixel location of the detected edge or end of the component. For example, in a field of view captured in an image, the optical control system 402 may be calibrated to assign a position or distance to one or more pixels in the captured image. Pixels associated with the detected edge or end of the crane component may then be compared to the positions or distances assigned to those pixels to determine a position or distance of the detected edge or end of the component.

Alternatively, or in addition, the computer readable storage medium 414 may have stored therein a plurality of baseline images. The baseline images may be captured in the same field of view as the captured image from the image capture assembly 400. The captured image may then be compared to the stored image, for example, to detect the presence or absence of a particular component. Crane components may also be detected in manner described above. The optical detection system 400 may then analyze the captured image, for example, by comparing relative positions of components in the captured image and the baseline image or comparing relative conditions or appearances of the components in the captured image and the baseline image. The optical detection system 400 may then determine a status or condition of the detected component based on the comparison. In such an embodiment, the image capture assembly 410 may be positioned to capture images of the object at views which closely correspond to the views at which the stored images were taken. Accordingly, accurate comparisons may be made between stored images or diagrams and captured images.

In other embodiments, the location of the end or an edge of the crane component may be calculated in real time based on the detected pixel location in the field of view of the image capture assembly 410. For example, if the end or edge of the crane component is determined to be at a particular angle relative to a centerline of the image capture assembly 410, then a table may give an extension corresponding to that particular angle. In other embodiments, the detected end or edge may be at a particular pixel location, which is then looked up on the chart to give an extension corresponding to that particular pixel location. In still other embodiments, once the relative location of the crane component end or edge is detected, the physical length of the crane component may be calculated using commonly known techniques such as trigonometry or geometry.

Alternatively, or in addition, the optical detection system 400 may detect a visible target or marker 42 (see FIGS. 5 and 6) disposed on the crane component. Through such detection, the optical detection system 400 may analyze the marker 42 to determine a status of the crane component, for example, a position of the crane component, movement of the crane component, and/or the existence of the crane component. In one embodiment, the marker 42 may be horizontal lines, but other patterns may be used as well. In other embodiments, the marker 42 may be a color coating on a crane component. The optical detection system 400 may detect the markers 42 using conventional pattern recognition algorithms. The pattern recognition algorithms may be stored in a memory and/or executed by a processor of the optical control system 402 of the optical detection system 400, and/or at the individual image capture assemblies 410. In one embodiment, a plurality of known markers may be stored in the computer readable storage medium 414, and a marker 42 captured in an image may be compared to the known markers. If the detected marker 42 is found to match a known marker, the optical detection system 400 may then identify the detected marker as corresponding to the known marker.

The optical detection system 400 may have stored therein, for example at the computer readable storage medium 414, additional information 424 associated with the known marker. Accordingly, when analyzing a detected marker 42, the optical detection system 400 may identify the detected marker 42 as corresponding to a known marker, retrieve the additional information 424 associated with the known marker, and associate the retrieved additional information with the detected marker 42. The additional information 424 may include, for example, position information or component-specific information, such as a type of component. Conversely, the optical detection system 400 may detect the absence of a marker 42 that was previously detected or expected to be detected, and determine a status based on the detected absence of the marker 42.

In each of these embodiments, when detecting objects in the captured image, the optical detection system 400 is configured to differentiate the crane component or marker 42 from the background in the image. In some embodiments, the target or marker 42 on the crane component may be a section that is coated with a special color and/or pattern to help differentiate the crane component from the background. For example, the crane component could have a fluorescent marker, a reflective marker, or other highly visible marker to increase contrast of the crane component relative to the background.

In one embodiment, a visible portion of the marker 42 may be captured in an image by the one or more image capture assemblies 410. The optical control system 402 may then convert the captured marker image 42 into a code representing the visible portion of the image. For example, if the marker 42 included five lines that were visible to and captured by the image capture assembly 410, the optical control system 402 may convert the image (i.e., the captured image of the marker 42) into a numeric code of five. The pattern may directly correspond to a measurement, e.g., each line could be one foot apart, or other predetermined unit of measurement, such that the numeric code is a direct measurement. In some embodiments, the numeric code may be compared to a stored table to look up information associated with the marker 42. In another embodiment, the marker 42 may be disposed at a location on the crane component that corresponds to qualitative or quantitative positions of the crane component. For example, when a marker 42 is moved into the field of view of the image capture assembly 410, the marker 42 may be detected by the optical detection system 400 and identified, for example, by a comparison to the stored markers as detailed above. The optical control system 402 may then identify and retrieve any additional information 424 that may be associated with the known marker 42 and associate the additional information with the detected marker 42.

Each of the aforementioned detection methods may be combined with other methods listed so as to aid, backup and/or give an alternate or redundant method of determining a status of the crane component. For example, the marker 42 may generally be used for measurements while end or edge detection of the crane component may be used to verify the measurement. In one embodiment, it is envisioned that if the marker 42 were obscured and the image capture assembly 410 missed a portion of the marker 42, the detected edge or end of the crane component may give a reading inconsistent with the captured, or detected, marker 42, and may alert the operator to a possible problem.

Thus, in one embodiment, the optical detection system 400, and in particular, the optical control system 402, may detect various objects, such as a crane component and/or the marker 42 in a captured image using object recognition software, analyze the detected objects, and determine the status of the crane or a crane component based on the detected objects. The crane component for which a status is determined may be the detected crane component or a separate crane component. The object recognition software may be stored in the computer-readable storage medium 414. In one embodiment, the object recognition software is conventional, using conventional methods understood by those having ordinary skill in the art to detect or differentiate objects in a captured image or video. It is understood that the present disclosure is not limited to the object recognition techniques described herein, and that other known object recognition techniques or algorithms may be used.

Figure 6:
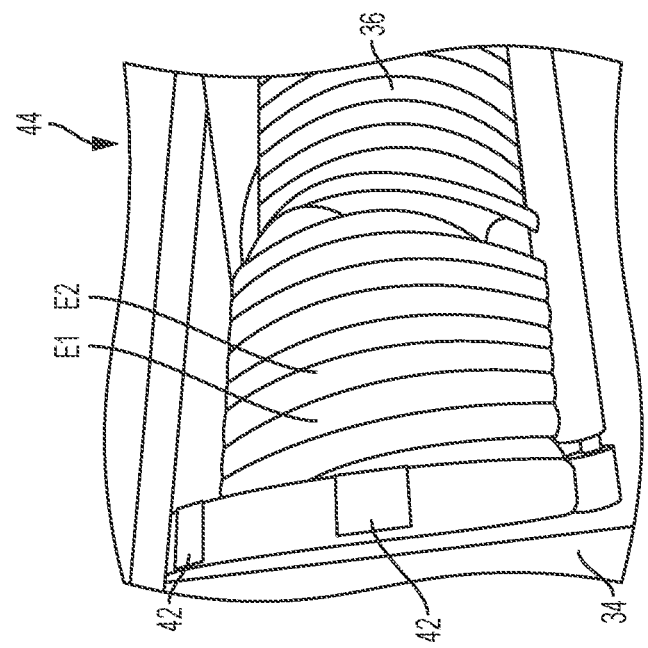
FIG. 6 is another example of an image captured by the optical detection system.
Figure 5:
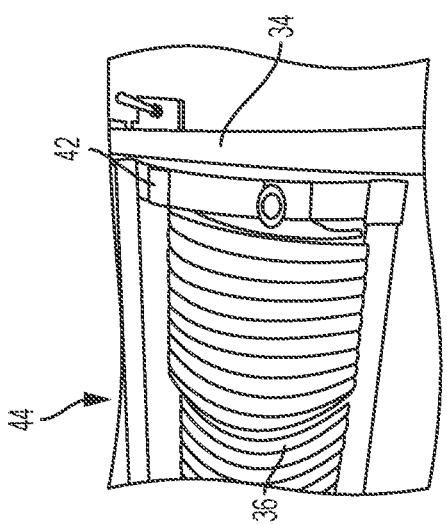
FIG. 5 is an example of an image captured by the optical detection system.

FIGS. 5 and 6 are examples of images 44 captured by an image capture assembly 410. Referring to FIGS. 5 and 6, in one embodiment, crane components in a field of view of the image capture assembly 410 may include the hoist 34 and the rope 36. The image capture assembly 410 may be mounted on, for example, the operator cab 28, the boom 32, the counterweight assembly 30 or other component of the superstructure 14, and be directed so that the hoist 34 is in the field of view. In one embodiment, the image capture assembly 410 and hoist 34 remain in a fixed position relative to one another during a monitoring operation of the hoist 34 and rope 36.

The hoist 34 generally includes a rotatable hoist drum 46 (see FIGS. 7-10 and 12-16, for example) configured to have the rope 36 wound and unwound therefrom. The hoist drum 46 may be driven to rotate by a motor (not shown). One or more markers 42 may be disposed along a portion of the hoist drum 46. In one embodiment, the markers 42 may be disposed along an outer circumferential surface hoist drum 46. The markers 42 may also be equally spaced from one another.

The rope 36, as detailed above, may be any type of rope or cable suitable for use in lifting operations carried out by a crane. As shown, for example, in FIG. 18c, in one embodiment, the rope 36 is made of a plurality of wires 48 of material. A first plurality of wires 48 may be wound to form a first strand 50 of the material. In one embodiment, the rope 36 may include a plurality of strands 50 of material wound with one another. That is, for example, a second plurality of wires 48 may be wound to form a second strand 50 of the material, and the first and second strands 50 may be wound together to form the rope 36. Third, and subsequent pluralities of wound wire 48 and strands 50 of the material are envisioned as well. In one embodiment, the rope 36 may be a DYFORM® rope.

The image capture assembly 410 is positioned with the hoist 34 and rope 36 in its field of view to monitor the hoist 34 and rope 36. The image capture assembly 410 may capture images of the hoist 34 and rope 36 at predetermined time intervals, in response to an operator input to control the hoist 34, and/or during one or more predetermined operations of the hoist 34 and rope 36. In one embodiment, the image capture assembly 410 may also capture a video of the hoist 34 and rope 36.

In one embodiment, the optical detection system 400 may use one or more of the object detection techniques described above to detect, for example, one or more of the hoist 34, the hoist drum 46, the rope 36, one or more wraps 52 (see FIG. 7) of the rope 36 on the hoist drum 46, individual wires 50 of the rope 36, individual strands 52 of the rope 36, and markers 42 on the hoist 34. In addition, by detecting a wrap 52 of the rope 36, the optical detection system 400 may also detect a number of wraps 52 of the rope 36 on the hoist drum 46, an angle of the wraps 52 of the rope 36 on the hoist drum 46, a spacing of the wraps 52 on the hoist drum 46, a number of layers of rope 36 on the hoist drum 46 (see, for example, RL1, RL2, RL3 in FIGS. 15 and 16) and a linearity or parallelness of the wraps 52 of the rope 36 on the hoist drum 46.

Figure 17A:
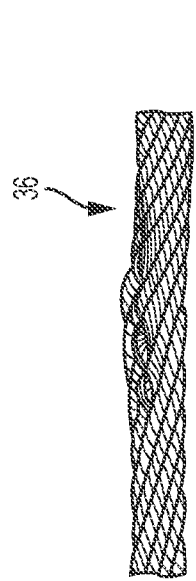
FIGS. 17a-17d illustrate some examples of rope, strand and wire conditions that may be detected by the optical detection system, according to an embodiment.
Figure 17B:
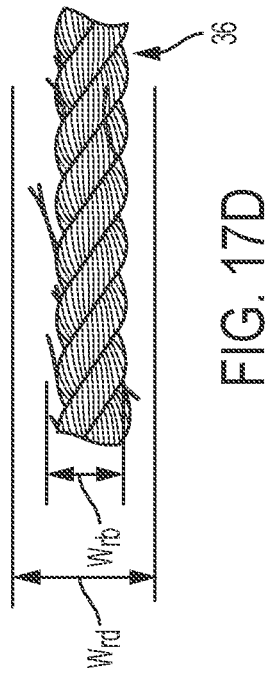
Figure 17C:
Figure 17D:
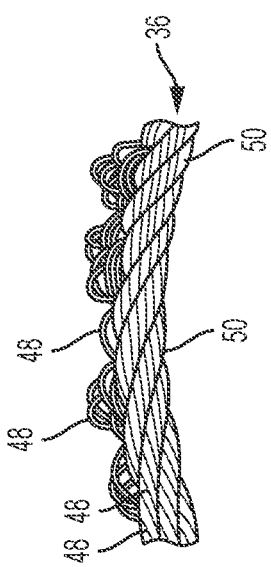

In one embodiment, using the optical detection techniques described above, the optical control system 402 may detect edges of individual rope wraps 52 on the hoist drum 46. Examples of such detected edges are shown in FIG. 6 as E1 and E2. Similarly, the optical control system 402 may also detect edges of the wires 48 and strands 50. Accordingly, the optical control system 402 may detect, qualitatively, a width of a rope wrap 52, wire 48 and strand 50. Further analysis by the optical control system 402 of the detected objects may be performed to determine a width of a rope wrap 52, wire 48 and strand 50. The optical control system 402 may also detect, or be provided with, a baseline width $W_{rb}$ for a rope wrap 52, wire or strand 50. The baseline width $W_{rb}$ may be input to the optical control system 402 by an operator, or identified in a captured image, for example, before operation of the hoist 34. The baseline width $W_{rb}$ may correspond to a width of the rope 36, wire 48 or strand 50 in a confirmed condition, e.g., in a condition suitable for lifting operations. Examples of a baseline width $W_{rb}$ and a detected with $W_{rd}$ are shown in FIGS. 17a and 17d. In one embodiment, the rope 36 or wraps 52 of the rope 36 may detected using the methods described above. That is, a change in a condition of the rope 36 may be determined based on a detected change in width or diameter rope 36.

By way of optical detection of the components described above, the optical control system 402 may determine one or more of the following statuses or conditions: amount of rope 36 payed out, or unwound, from the hoist drum 46; hook (or hook block) height; anti-two block; hoist direction; hoist erratic winding; current layer and/or last layer of the rope 36 on the hoist drum 46; third wrap of the rope 36 on the hoist drum 46; hoist speed of winding and/or unwinding; hoist movement; rope 36 size; rope 36 pull through, diving and/or bury; rope 36 climbing on the hoist drum 46; rope 36 wrap tightness on the hoist drum 46; reverse wrapping of the rope 36; rope 36 type, including lay type; loss of tension in the rope 36; and rope 36 damage, wear or other rope conditions, such as birdcaging.

With reference to FIG. 7, the optical control system 402 may determine the amount of rope 36 payed out by detecting individual wraps 52 of rope 36 on the hoist drum 46 in one or more captured images. The optical control system 402 may further analyze the captured image to count a number of the wraps 52 of rope 36 on the hoist drum 46. In addition, known information may be input into the optical detection system 400. Such known information may include an initial amount, or length, of rope 36 on hoist drum 46 before any rope 36 is payed out. Other known information may include an average length of rope 36 corresponding to each wrap 52 of the rope 36 on the hoist drum 46. The average length of rope 36 may generally correspond to a known circumference of the hoist drum 46, but may be adjusted to account for layering of the rope 36 on the hoist drum 46. Alternatively, a length of rope 36 for each wrap 52 may be used which corresponds to a respective layer of the rope 36 on the hoist drum 46. For example, a wrap 52 of rope 36 on an outer layer may have a greater length associated with each wrap 52 than a wrap 52 of rope 36 on an inner layer. In one embodiment, length of the rope wrap 52 may be input for each layer (e.g., RL1, RL2 . . . ) of rope 36 on the hoist drum 46. Further, in one embodiment, the layers could be input into the crane control system 300 or optical detection system 400 as feedback to control the rope payout speed. Accordingly, the optical control system 402 may detect and count a number of wraps 52 of the rope 36 on hoist drum 46, monitor a change in the number of wraps 52 by analyzing subsequent captured images, and count the change in the number wraps. With the calculated change in the number of wraps 52, along with the known information, the optical control system 402 may determine the amount of rope 36 payed out from the hoist drum 46.

The optical control system 402 may determine the hook height, i.e., a height of the hook block 37, which is configured for engaging a load at a free end of the rope 36, based, at least in part, on the determination of how much rope 36 has been payed out, described above. Calibration of the hook height may be carried out by the operator, through a controller, or automatically. For example, the operator may control the hoist 34 to raise the hook block 37 to a predetermined limit near a boom tip 33. A known boom length, location of the hoist 34 or hoists, reevings and a known boom lift angle may be input to the optical control system 402 manually or by way of corresponding sensors (not shown) communicably connected to the optical control system 402. With the known information and the hook block 37 positioned at the predetermined limit, the hook height at the predetermined limit position may be determined and used as a baseline value. The amount of rope 36 subsequently payed out, which may be determined as detailed above, then corresponds to a change in the hook height. Accordingly, in one embodiment, the optical control system 402 can determine hook height based on, for example, the baseline value of the determined amount of rope 36 payed out. In another embodiment, the hook height may be determined by lowering the hook block to the ground to set a length. Still another embodiment may include calculating the lowest height of the hook block before a given configuration and comparing a calculated rope pay out to the calculated lowest height.

The optical control system 402 may determine a current or approaching two-blocking condition (i.e., where a hook block is brought into contact pulley block or other component at the boom tip). Thus, the optical control system 402 may provide anti-two-block functionality. For example, the optical control system 402 may determine the hook height in the manner detailed above. In addition, the baseline value of the hook height is known as detailed above, and the baseline value corresponds to a predetermined limit position of the hook block 37 relative to the boom tip 33. The optical control system 402 may perform an analysis which includes comparing the current hook height to the baseline value. Accordingly, the optical control system 402 may determine a two-blocking condition based on the comparison. For example, in one embodiment, a two-blocking condition may be determined if the current hook height is equal to or greater than the baseline value, for example, if the hook block 37 is moved to a position between the baseline value height and the boom tip. Alternatively, the optical control system 402 may determine a two-blocking condition if the current hook height is within a predetermined threshold distance of the baseline. Thus, a two-blocking condition may be determined as the hook block 37 approaches the boom tip 33.

A set up function may also be incorporated to set an initial rope length. An input from the crane control system 300 may also be used to obtain a number of reevings on the hook block 37. The anti-two block system employed by the optical control system 402 as described herein may also be used in conjunction with, or as a backup for a traditional anti-two block system. A verification of the hoist limit may be made after each change of hook block 37 or reeving of the hook block 37.

The optical control system 402 may determine a direction of hoist movement by using one or more techniques. In one embodiment, and with reference to FIGS. 5, 6 and 8, the hoist 34 may include a plurality of markers 42 on the hoist drum 46. The markers 42 may be contrasting markers 42 spaced by a sufficient distance so that even at a high speed of rotation of the hoist 34, the markers 42 may still be captured by the image capture assembly 410 and detected in the captured image by the optical control system 402. In one embodiment, capturing an image of the hoist 34 in which the markers 42 may be detected is a function of a frame rate of the image capture assembly 410, processing speed of the optical control system 402 and a speed of the hoist 34. The optical control system 402 may analyze a series of two or more captured images and compare a position of the detected markers 42 across the sequence of captured images. Accordingly, by detecting markers 42 on the hoist 34, the optical control system 402 can determine a position of markers 42, and in turn, if the position of the markers 42 is changing between sequential captured images. By determining a change in position of a detected marker 42, the optical detection system 402 may determine a direction of movement of the hoist 34. In one embodiment, the optical control system 402 may identify the detected markers so that movement of the detected and identified markers 42 may be tracked across a sequence of captured images.

Alternatively, or in addition, the optical control system 402 analysis may include a comparison of the markers 42 detected in the captured images to stored images of known markers and obtain additional information associated with the known markers 42. When a detected marker 42 is determined to match a known marker, the associated information may then be associated to the detected marker 42. The associated information may be position information. The position information may be, for example, a position of the marker 42 relative to a reference point on the hoist drum 46, wherein the position of the marker 42 relative to the reference point remains fixed. For example, a particular marker 42 may be positioned at a fixed angular distance from the reference point, and the reference point and marker 42 rotate together with movement of the hoist 34. In this manner, the optical control system 402 may determine, based on the detected marker or markers 42 and associated position information, if the hoist 34 is moving and the direction of the movement. Alternatively, or in addition, the additional information may include unique identification information for each detected marker 42. Accordingly, the optical control system 42, may determine, based on the detected marker or markers 42, and the associated unique identification information, if the hoist 34 is moving and the direction of such movement.

Additionally, with spacing between markers 42 being known or detected, and a frame rate of the image capture assembly 410 being known, the optical control system 402 may determine a direction of movement of the hoist 34 by comparing the position of markers 42 in a sequence of captured images.

In another example, the optical control system 402 may monitor the rope 36 to determine if the hoist 34 is rotating. For example, at higher speeds, the number of rope wraps 52, detected in the manner described above, may be monitored. If a change in the number of rope wraps 52 is detected over a sequence of captured images, the optical control system 402 may determine that the hoist 34 is rotating. At lower speeds, a direction of the rope 36 movement may be detected over a sequence of captured images. That is, the optical control system 402 may analyze a series of captured images, detect the rope 36 and rope wraps 52, analyze a number of rope wraps 52 and determine whether the rope 36 is being wound or unwound from the hoist drum 46. In one embodiment, the optical control system 402 analyzes a direction on the hoist drum 46 in which the number of rope wraps 52 is increasing or decreasing. If a determination is made that the number of rope wraps 52 is changing, the optical control system 402 may then determine that the hoist 34 is moving and a direction of the movement. In another embodiment, the optical control system 402 may detect a leading rope wrap 52 on the outermost layer of rope on the hoist drum 46, and, over a sequence of images, detect if the leading rope wrap 52 is moving toward or away from an edge of the hoist drum 46. That is, the optical control system 402 may determine a direction of hoist rotation by detecting and analyzing a direction of movement of the leading rope wrap 52 on the outermost rope layer (e.g., RL1, R12 . . . ).

Figure 11:
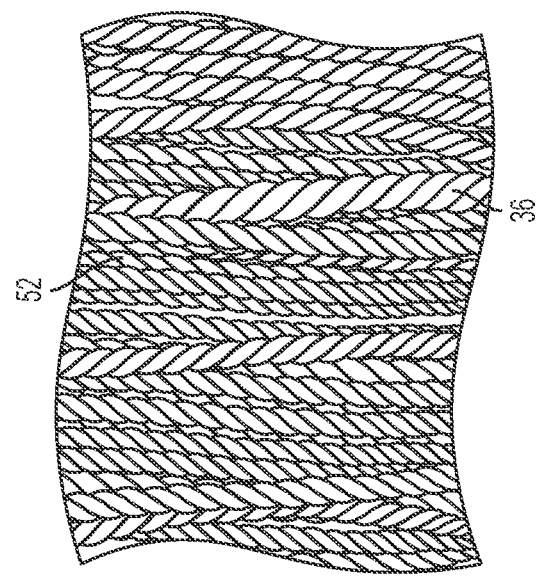
FIG. 11 is an example of a captured image of a rope wound on a hoist in another condition.
Figure 10:
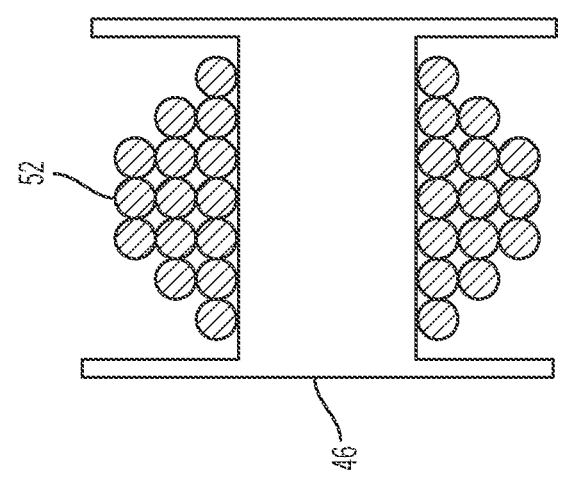
FIG. 10 is a cross-section of a hoist having a rope in another condition according to an embodiment.
Figure 9:
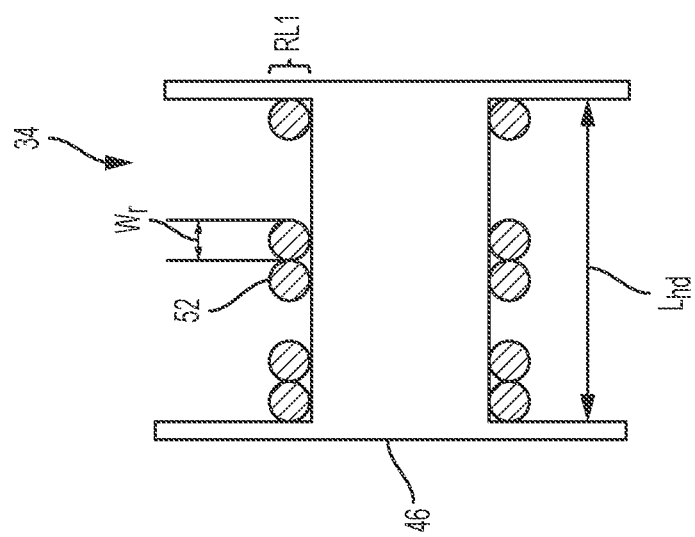
FIG. 9 is a cross-section of a hoist having a rope in another condition according to an embodiment.

The optical control system 402 may determine if the rope 36 is being erratically wound on the hoist 34, for example, as shown in FIGS. 9-11. For example, as detailed above, the optical control system 402 is configured to detect the rope 36 as well as wraps 52 of the rope 36 on the hoist drum 46. By detecting individual wraps 52, the optical control system 402 may analyze the detected wraps 52 to compare the wraps 52 for parallelness. In one embodiment, the analysis may include a comparison of detected edges and/or centerlines of the wraps 52 to other wraps 52 on the hoist drum 46 for parallelness. If the wraps 52 are determined to not be parallel, the optical control system 402 may determine that the rope 36 is being erratically wound on the hoist 34.

Figure 13:
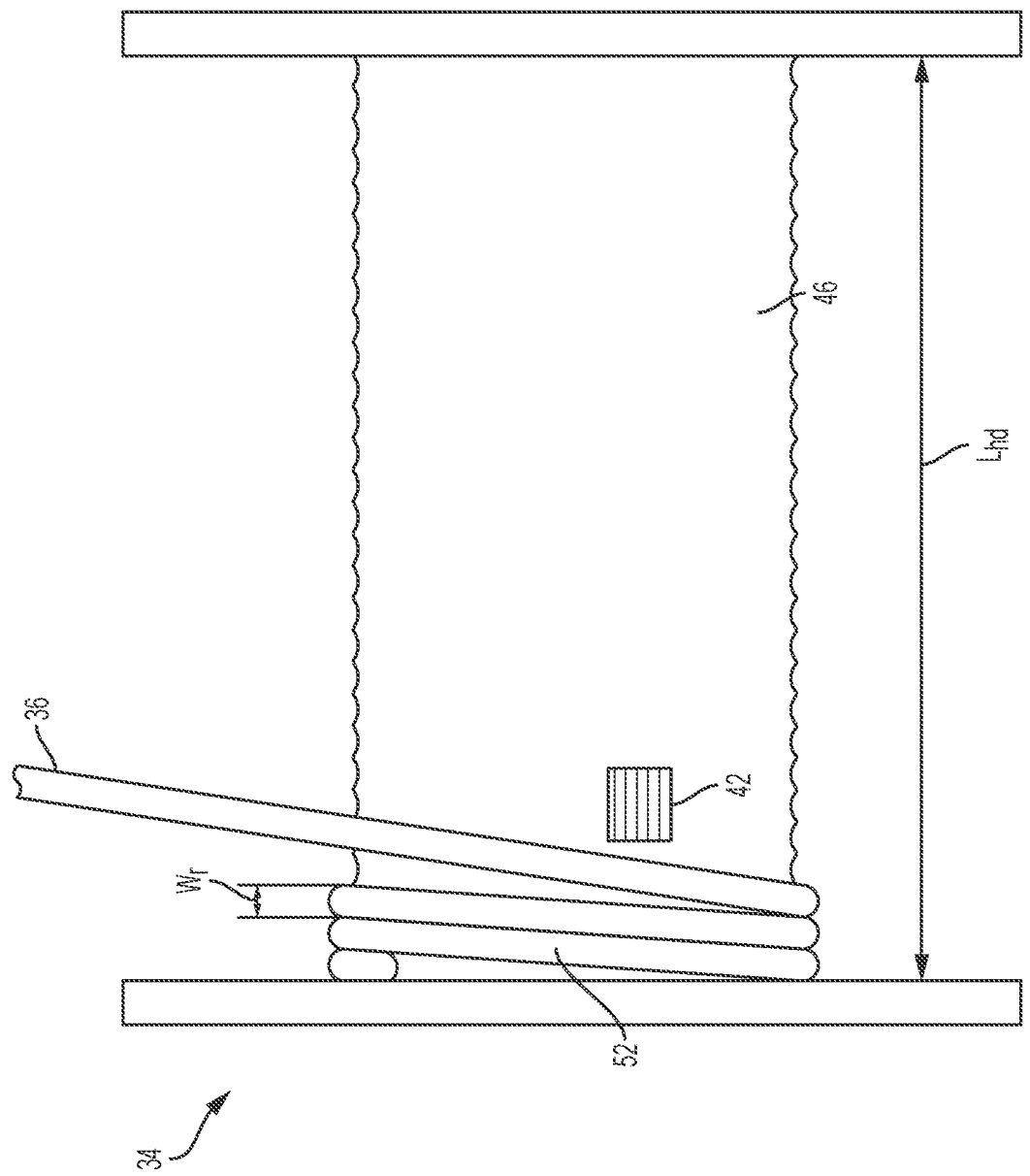
FIG. 13 is a front view of a hoist having a rope in another condition according to an embodiment.

The optical control system 402 may determine the current and last layer of rope 36 on the hoist drum 46. Referring to FIGS. 12 and 13, in one embodiment, this determination may be accomplished by detecting, with the optical control system 402, the rope 36 and/or the rope wraps 52 on the hoist drum 46 in a captured image. Each rope wrap 52 has a known, substantially constant width $W_r$ which may be input into or calculated by the optical control system 402. In addition, a length $L_{hd}$ of the hoist drum 46 may be known and input into the optical detection system 400 or determined by the optical control system 402. FIG. 12 shows the hoist drum 46 having at least a first layer RL1 and a second layer RL2 of rope 36 thereon. It is understood that only the visible portion of the first layer RL1 is depicted and labeled in FIG. 12 and that the first layer RL1 at least partially underlies the second layer RL2. Each rope layer RL1, RL2 is formed by a plurality of wraps 52 extending across the length $L_{hd}$ of the hoist drum 46. Accordingly, an initial analysis may be carried out by the optical control system 402 to calculate a baseline number of wraps 52 in a complete layer RL1, RL2. With a total number of wraps 52 determined, the current rope layer RL2 may be determined by comparing a detected number of wraps 52 to the base line number of wraps per layer. In one embodiment, the baseline number of rope wraps 52, and in turn, layers RL1, RL2 may be determined by completely unwinding the rope 36 from the hoist drum 46, then winding the rope 36 on the hoist drum 46, and counting the number of wraps 52 as the rope is wound on the hoist drum 46. In still another example, a number of rope layers RL and in turn, a current rope layer RL may be determined by detecting a change, and/or counting a number of changes in rope layer height $H_{RL}$ or total diameter of rope 36 on the hoist drum 46.

In another embodiment, as a result of the perspective in a field of view of the image capture assembly 410, rope wraps 52 in outer layers (RL2, for example) on the hoist drum 46 will appear in the captured image having a greater width $W_r$ than rope wraps 52 of inner layers (RL1, for example). The optical control system 402 may determine a captured a width of a rope wrap 52 in the captured image, and compare the captured width to a stored table of widths, where each width corresponds to a rope layer (RL1, RL2 . . . ) on the hoist drum 46. That is, the rope wraps 52 may be detected having a different width for each rope layer (RL1, RL2 . . . ) due to the perspective and relative distance from the image capture assembly 410. A table stored in the computer readable storage medium 414 may have a correspondence between a captured rope 36 or rope wrap width 52 and a layer RL1, RL2 on the hoist drum 46. In this manner, a current layer may be determined as well. A first layer, last layer and intermediate layers of rope may be determined in this manner as well.

Alternatively, or in addition, a last layer on the hoist drum 46, as shown in FIG. 13, for example, may be determined when the optical control system 402 detects an exposed hoist drum 46. The exposed hoist drum 46 may be detected through a number of techniques. For example, the hoist drum 46 may include one or more markers 42 which become visible when the rope 36 is unwound to an extent where the hoist drum 46 is exposed, and analyze the detected marker 42. In another example, the optical control system 402 may analyze the detected objects to differentiate between the hoist drum 46 and the rope 36 in a captured image using the object recognition algorithms described above. In still another embodiment, the optical control system 402 may detect a number of rope wraps 52 and, in an analysis of the detected rope wraps 52, compare the detected number of rope wraps to the calculated baseline number of rope wraps 52 in a layer.

The third wrap status refers to a condition where the are only three wraps of the rope remaining on the hoist drum 46. This condition, as shown in FIG. 13, for example, occurs when nearly all of the rope 36 has been unwound from the hoist drum 46. As detailed above, the optical control system 402 may detect, in a captured image, the individual wraps 52 of the rope 36 on the hoist drum 46, and analyze the detected wraps 52 to count a number of wraps 52 on the drum 46. Accordingly, the optical control system 402 may detect when there are only three wraps 52 of the rope 36 remaining on the hoist drum 46. Alternatively, or in addition, the hoist drum 46 may include a marker 42 which becomes visible when only three wraps of the rope 36 remain on the hoist drum 46. The optical control system 402 may detect the marker 42, in a captured image, analyze the marker 42, and determine that only three wraps of the rope 36 remain on the hoist drum 46. Analysis of the marker 42 may include identifying the marker 42 as a marker 42 which indicates three wraps 52 of the rope 36 remain on the hoist drum 46. For example, the captured marker 42 may be compared to a stored marker, and if the captured marker 42 is the same as a stored marking, additional information associated with the stored marker may be retrieved including an indication that the captured marker 42 is an indicator of the third wrap status.

The optical control system 402 may also determine the hoist speed of winding and/or unwinding. Referring again to FIG. 8, in one embodiment, the hoist 34 may include the one or more markers 42. The markers 42 may be detected in a captured image in the manner detailed above. The markers 42 may be, for example, either painted markers, decals or other similar types of markers 42. With a known spacing between markers 42 and a known time interval, the optical control system 402 can determine a rotational speed of the hoist 34 by counting the number of markers 42 to move past a fixed reference point (not shown). The fixed reference point may be, for example, a physical object fixed relative to the hoist 34 and captured in the image, or a conceptual or virtual reference point generated by the optical control system 402 within the field of view, such as a pixel or a line of pixels in the captured image. Alternatively, or in addition, the optical control system 402 may determine hoist speed by analyzing a sequence of captured images to detect a rate of change of the number of wraps 52 of rope 36 on the hoist drum 46. The wraps 52 of rope 36 may be detected in the manner described above. Accordingly, with a known length of the rope 36, or average length of the rope 36, for each wrap 52, the hoist 34 speed may be determined by detecting a change in the number of wraps 52 over time.

Figure 8:
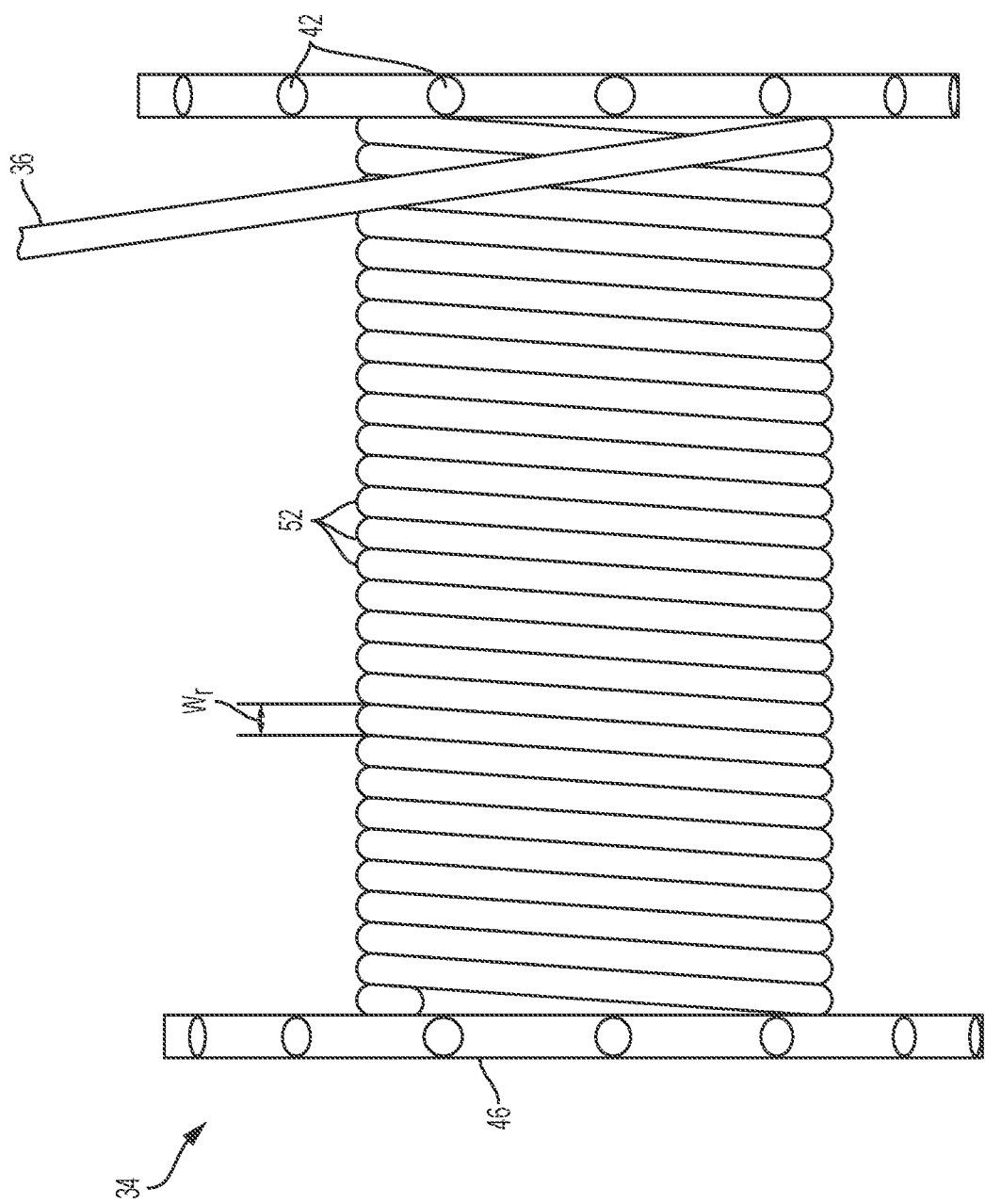
FIG. 8 is a front view of a hoist according to another embodiment.

The optical control system 402 may also determine if the hoist is moving, i.e., winding or unwinding. With further reference to FIG. 8, and as detailed above, the optical control system 402 may detect markers 42 on the hoist 34. The markers 42 may be disposed on the hoist drum 46 at a section not covered by the rope 36. By analyzing a sequence of captured images and detecting the markers 42, the optical control system 402 may detect a change in position of the markers 42, or a change in markers 42 at a fixed point in the captured image. Accordingly, the optical control system 402 may determine if the hoist 34 is moving. Alternatively, or in addition, as detailed above, the optical control system 402 may also detect rope wraps 52 on the hoist drum 46 in a captured image and analyze the detected wraps 52 to count a number of wraps 52. If a change in the number of wraps 52 is detected, the optical control system 402 may also determine that the hoist is moving.

The optical control system 402 may also determine the rope 36 size or width $W_r$ (see FIGS. 7, 8, 9 and 12, for example). In one embodiment, for example, the rope 36 may be captured in an image and detected in the manner described above. An actual width $W_{actual}$ of the rope 36 may be entered into the optical control system system 402 as a known value. The optical control system 402 may calculate the rope width $W_r$ from a captured image, for example, by counting a number of pixels. In one embodiment, a rope 36 having a known width $W_{actual}$ may be used to calibrate a width detection process of the optical control system 402. For example, the optical control system 402 may analyze a captured image, detect a rope, and analyze the detected rope 36 to count a number of pixels extending across the rope 36. Accordingly, rope width-per-pixel dimension may be calculated. The rope width-per-pixel may vary with each layer of rope 36 on the hoist drum 46 due to the perspective and distance to the image capture assembly 410.

Alternatively, or in addition, the optical control system 402 may count the number of wraps 52 of the rope 36 in a complete layer on the hoist drum 46. With a length $L_{hd}$ of the hoist drum 46 known (for example, by user input), a width $W_r$ of each wrap 52, and thus a width or diameter of the rope 36 may be determined. In one embodiment, the rope width determined by the optical control system 402 may be compared to a user-input rope width, by the optical control system 402, to confirm the rope width. Accordingly, the optical control system 402 may determine a width or diameter of the rope 36 and compare the determined diameter or width to an input rope width value. If the determined rope width value varies from the input value, the optical control system 402 may further determine that the rope 36 is damaged, worn, or has been otherwise affected in a manner which decreases the diameter of width.

The optical control system 402 may also determine rope pull through, diving or bury of the rope 36, as shown, for example, in FIG. 14. In one embodiment, the optical control system 402 may detect the rope 36 and the rope wraps 52 in the manner described above. Referring to FIGS. 14 and 15, in one embodiment, the optical control system 402 may analyze the detected rope 36 and rope wraps 52 to further detect a parallelness of the rope wraps 52, in the manner described above. For example, an edge or center of each rope wrap 52 may be detected. A section of rope 36 that has pulled through to another layer, shown in FIG. 14 at point 'P', will be detected as being non-parallel to adjacent rope wraps 52. For example, referring to FIG. 14, and for clarity, an edge of a pulled-through section of the rope 36 is shown as extrapolated line E1, while an edge of a properly wound section of rope 36 is shown as extrapolated line E2. As may be seen from the extrapolated lines E1, E2, an edge of a properly wound section of rope 36 does not extend parallel to an edge of a pulled-through section of rope 36. In this manner, the optical control system 402 may determine if the rope 36 has pulled through, dove or buried.

A rope climbing condition on the hoist drum 46, as shown in FIG. 16 for example, may also be determined by the optical control system 402. In one embodiment, the optical control system 402 may detect a rope wrap 52 having a greater width than adjacent wraps 52. The detected greater width of the rope wrap 52 may be due to closer proximity of a climbing rope C to the image capture assembly 410. That is, a portion of the rope 36 that is climbing on the hoist drum 46 will be closer to the image capture assembly 410. Thus, in a captured image, the climbing portion C of the rope 36 will appear to have a greater width than adjacent, properly wound wraps 52 of rope 36. In this manner, the optical control system 402 may determine a condition where the rope 36 is climbing. In one embodiment, the width of the rope wraps 52 may be measured in pixels, which may be counted during analysis of the detected rope wraps 52 by the optical control system 402. In another embodiment, the optical control system 402 may analyze the detected wraps of rope to determine an actual width in the manner described above. In another embodiment, the optical control system 402 may detect an unexpected increase in rope layer diameter. For example, referring to FIG. 16, the optical control system 402 may expect the rope wraps 52 to continue in the third rope layer RL3. Accordingly, if the optical control system 402 detects a rope wrap 52 in a fourth rope layer RL4, then the optical control system 402 may determine that a rope climbing condition exists.

The optical control system 402 may also determine the rope wrap tightness on the hoist drum 46. Referring again to FIG. 9, the rope wrap tightness may be determined, for example, by detecting rope wraps 52 in a captured image, and analyzing the detected rope wraps 52 to obtain a count of the number of rope wraps 52 in a layer RL1 on the hoist drum 46. The wrap tightness may also be determined by monitoring for spaces between the rope wraps 52. In one embodiment, space between adjacent rope wraps 52 may be detected when a width $W_r$ of the rope 36 is known, and adjacent rope wraps 52 are detected. In a tightly wrapped configuration, the distance between centers of adjacent wraps should be approximately equal to the rope width $W_r$, while in a loosely wrapped configuration, such a distance will exceed that rope width $W_r$ by a predetermined threshold amount. That is, the optical control system 402 may detect a plurality of rope wraps 52 and analyze the detected rope wraps 52 to identify edges and/or centers of the rope wraps 52 and where the rope wraps lie relative to one another. If a distance between adjacent rope wraps 52 varies from a known rope width outside of a suitable tolerance, the optical control system 402 may determine that the rope 36 is not tightly wound on the hoist drum 46.

Alternatively, or in addition, with a known length $L_{hd}$ of the hoist drum 46, and a known rope diameter D, the optical control system 402 may calculate a maximum number of rope wraps 52 to extend across the entire length of the hoist drum 46. The optical control system 402 may determine that the rope 36 is not tightly wrapped if the detected number of rope wraps 52 is less that the calculated maximum number of possible rope wraps 52.

Reverse wrapping occurs when the rope 36 completely spools off of the hoist drum 46 and then rewraps back on to the hoist drum 46 in an opposition direction. The reverse wrapping condition may be determined by the optical control system 402. For example, in one embodiment, the optical control system 402 may detect the rope wraps 52 on the hoist drum 46, and may analyze the detected rope wraps 402 to detect which side of the hoist drum 46 the rope 36 is wound or unwound from (i.e., from over or under the hoist drum 46). The detected hoist side of winding/unwinding may be established as the baseline, or proper, side of the hoist drum 46 from which the rope 36 is wound or unwound. Accordingly, if the optical control system 402 detects the rope 36 being wound or unwound from a side of the hoist drum 46 that is different from the baseline side, the optical control system 402 may determine that the reverse wrapping condition is occurring. Alternatively, or in addition, the optical control system 402 may detect the lay of the rope 36 in a captured image, and analyze the lay to detect a direction thereof. A reverse wrapping condition may be determined by the optical control system 402 if the lay of one wrap 52 of the rope 36 is detected as being different from the lay another wrap 52 of rope 36. This is because the lay of the rope 36 in a reverse wrapped portion would be opposite the lay of the rope 36 in a properly wrapped portion.

The rope 36 type may be determined by the optical control system 402 as well. The optical control system 402 may analyze a captured image to detect, for example, the wires 48 which make up the strands 50 of the rope 36. By detecting individual strands 50 of the rope 36, further analysis by the optical control system 402 may provide a lay and direction of the wires 48, rotation resistance, number of strands 50, and the like. The optical control system 402 may then determine the type of rope 36.

Loss of rope tension may be determined by the optical control system 402. Determination of the loss of rope tension may be based, at least in part, on a detected lack of parallelness of the rope wraps 52 on the hoist drum 46, which may be detected and analyzed in the manner described above. For example, when the rope 36 is insufficiently tensioned, the rope 36 may not be tightly wound on to the hoist drum 46, resulting in rope wraps 52 wound on the drum 46 in a non-parallel relationship. Accordingly, the optical control system 402 may determine a loss of rope tension.

The optical control system 402 may also determine if a rope 36 is worn or damaged. The image capture assembly 410 is configured to capture an image of the rope 36 with sufficient resolution so as to permit detection of the rope 36, individual strands 50 of the rope 36, and individual wires 48 of the strands 50, as shown in FIGS. 17a-17d. Through analysis of the captured image or images, the optical control system 402 may monitor the rope 36 for wear or damage. A number of rope damage conditions may be determined by the optical detection system 400 including, but not limited to, worn rope, normal wear, heat damage, rotational damage, birdcage, reduction in diameter, rope stretch, snagged wires, crushed rope, high stranding, rope kinks, core protrusion, strand nicking, distortion of lay, and broken wires. Other rope conditions, including those described in ISO 4309 and/or ASME B30, both of which are incorporated by reference herein, may be determined by the optical detection system 400 as well. In such conditions, the wires 48 and/or strands 50 may be displaced from an initial, undamaged position. For example, the wires 48 or strands 50 may become loosely wrapped, extend in a non-parallel relationship to one another, or protrude outwardly. For example, a wire 48 may protrude outwardly from the strand 50. A width of the wires 48, strands 50 or rope 36 may also increase or decrease when damaged or worn.

The optical control system 402 may detect one or more of individual wires 48, strands 50, and rope 36, as detailed above, and analyze the detected objects to determine if any of the above conditions are present. It is understood, however, the optical detection system 400 is not limited to determining only the conditions described above. It is further understood that the optical detection system 400 need not detect the specific conditions which may indicate rope damage, but rather, may detect that the condition of the rope 36 has changed from an originally detected rope condition, for example, an initial undamaged condition.

In response to determining one or more of the conditions or statuses above, the optical detection system 400 may generate an alert, message, alarm or the like to inform the operator of a determined condition or status. Alternatively, or in addition, the optical detection system 400 may generate a control signal to control movement or operation of a crane component, for example, by controlling, or preventing operation of an actuator for a crane component.

In another embodiment, in response to determining one or more of the conditions or statuses above, the optical detection system 400 may generate and transmit an instruction to the crane control system 300. In response to receiving the instruction, the crane control system 300 may then generate an alert, message, alarm or the like to the operator to inform the operator of the determined condition or status. Alternatively, or in addition, the optical detection system 400 may generate and transmit a message to the crane control system 300 with information indicating a detected condition or status. In response to receiving such a message, the crane control system 300 may generate and transmit a control signal to control movement or operation of a crane component, for example, by controlling, or preventing operation of an actuator for a crane component.

Figure 18:
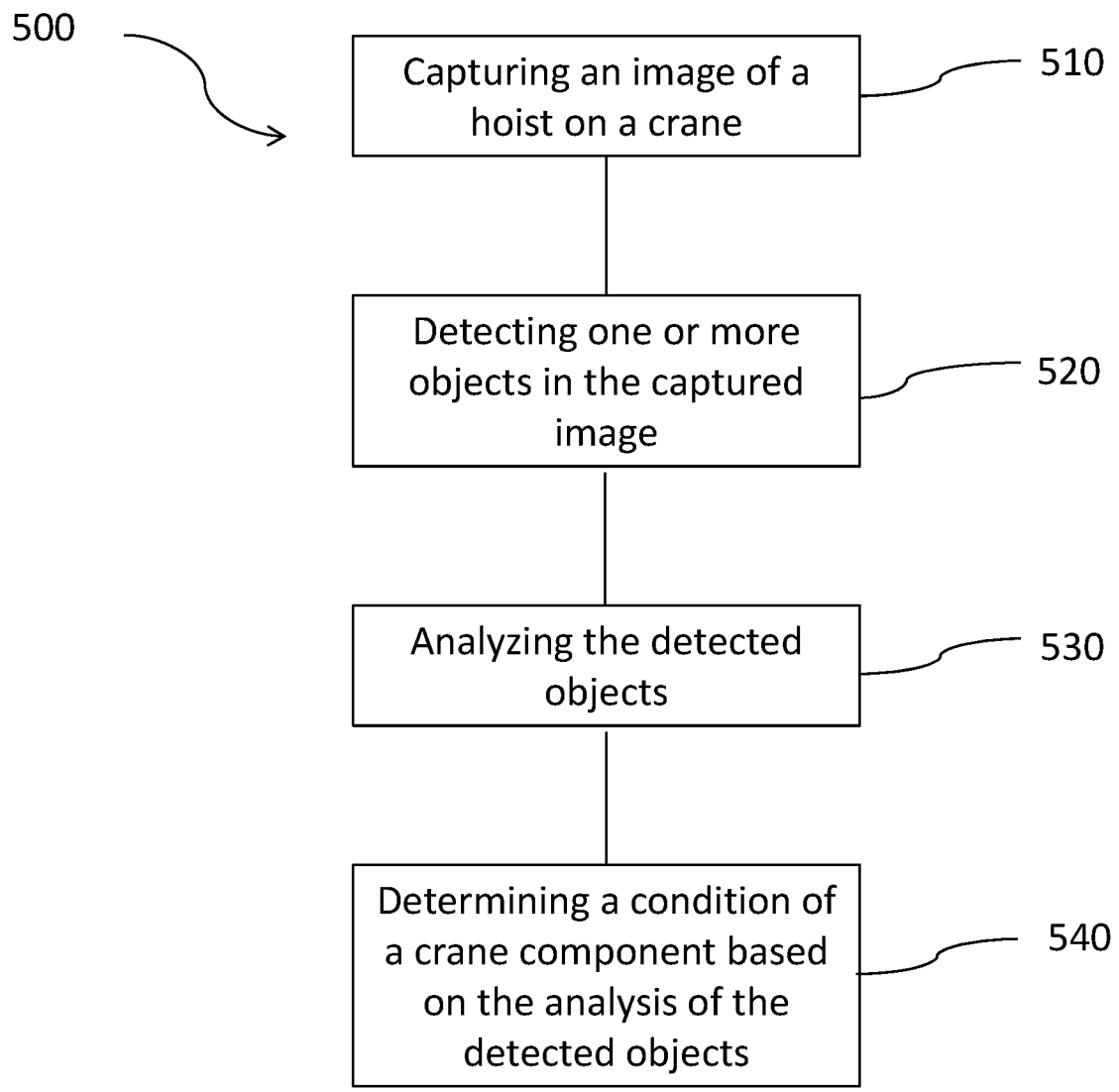
FIG. 18 is a block diagram illustrating a method of determining a condition of a crane component, according to an embodiment.

FIG. 18 is a block diagram showing a method 500 of determining a condition of a crane component, according to an embodiment. The method includes capturing 510, with an image capture assembly, an image of a hoist on a crane and detecting 520, with an optical control system 402, one or more objects in the captured image, wherein the one or more objects include: the hoist 34, a hoist drum 46, a rope 36 configured to be wound or unwound on the hoist drum 46, and one or more wraps 52 of the rope 36 on the hoist drum 46. The method further includes analyzing 530, with the optical control system 402, the detected objects, and determining 540, with the optical control system 402, a condition of a crane component based on the analysis of the detected objects.

Accordingly, in the embodiments above, an image capture assembly 410 may capture an image, or series of images, of a crane component, and the optical control system 402 may detect one or more objects in the captured images. For example, optical control system 402 may detect a hoist, a hoist drum, a marker, a rope, a wrap of rope on the hoist drum, a strand of the rope and a wire of the strand. The optical control system 402 may then analyze the detected objects and determine a status or condition of a crane component. The crane component for which a status is determined may be the detected crane component in a captured image, or a separate crane component. In some embodiments, the operator may be alerted to the status, crane operations may be controlled or prevented, or both, in response to a determined status or condition. In addition, the optical detection system 400 may detect a variety of different statuses or conditions. For example, with a captured image of a hoist and rope, the optical detection system may determine statuses such as: amount of rope 36 payed out, or unwound, from the hoist drum; hook (or hook block) height; anti-two block; hoist direction; hoist erratic winding; current layer and/or last layer of the rope on the hoist drum; third wrap of the rope on the hoist drum; hoist speed of winding and/or unwinding; hoist movement; rope size; rope pull through, diving and/or bury; rope climbing on the hoist drum; rope wrap tightness on the hoist drum; reverse wrapping of the rope; rope type, including lay type; loss of tension in the rope; and rope damage, wear or other rope conditions, such as birdcaging.

In the embodiments above, the objects detected and analyzed when a determining a particular condition of a crane component, may also be detected an and analyzed when determining different conditions of a crane component. That is, the detection of various objects and analyses described in the embodiments above may be combined with one another when determining the conditions described herein. Further, features of one of the embodiments described may be combined with or implemented in any of the other embodiments described above as suitable.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A crane comprising:
   a carrier;
   a superstructure coupled to the carrier, the superstructure including a boom;
   a hoist coupled to the superstructure, the hoist having a hoist drum and a rope configured to be wound and unwound around the hoist drum; and
   an optical detection system comprising:
      an image capture assembly comprising one or more image capture devices positioned to have a field of view in which the hoist is positioned, and configured to capture an image of the hoist; and
      an optical control system configured to:
         detect one or more objects in the captured image, the one or more objects selected from: the rope, the hoist drum, one or more wraps of rope on the hoist drum and a marker on the hoist;
         analyze the one or more detected objects in the captured image; and
         determine a condition of a crane component based on the analysis of the one or more detected objects,
         wherein a detected object of the one or more detected objects is the one or more wraps of rope on the hoist drum,
         wherein the one or more detected wraps of rope on the hoist drum are analyzed to count a number of wraps of rope on the hoist drum,
         wherein the determined condition of a crane component is one or more of: an amount of rope payed out or unwound from the hoist drum, a hook block height, anti-two block, hoist drum direction of movement, current layer or last layer of the rope on the hoist drum, hoist drum winding or unwinding speed, hoist drum movement, and
         wherein the determined condition is determined based on the number of wraps of rope detected on the hoist drum.

2. The crane of claim 1, wherein the one or more image capture devices include a camera.

3. The crane of claim 1, wherein a detected object of the one or more detected objects further includes one or more of the rope, the hoist and the marker, and wherein the determined condition of the crane component is further selected from one or more of: hoist erratic winding of the rope, rope size, rope pull through, diving or bury on the hoist drum, rope climbing on the hoist drum; rope wrap tightness on the hoist drum; reverse wrapping of the rope, rope type including lay type, loss of tension in the rope, and rope damage or wear.

4. The crane of claim 1, wherein the rope comprises a plurality of strands, and each strand comprises a plurality of wires, wherein the optical control system analyzes the one or more detected objects to identify edges of one or more of the rope, the strand and the wire.

5. The crane of claim 4, wherein the optical control system further analyzes the one or more detected objects to determine parallelness of the edges of the rope, strand or wire.

6. The crane of claim 1, wherein the optical control system analyzes the one or more detected objects to identify a number of pixels extending across a width of the one or more detected objects.

7. The crane of claim 1, wherein the optical control system analyzes the one or more detected objects to identify a marker.

8. The crane of claim 7, wherein the optical control system analyzes the marker to retrieve information associated with the marker.

9. The crane of claim 1, wherein the optical detection system is configured to generate a signal in response to determining a condition of the one or more detected objects.

10. An optical detection system for a crane having a hoist including a hoist drum and a rope configured to be wound and unwound around the hoist drum, the system comprising:
an image capture assembly comprising one or more image capture devices positioned to have a field of view in which the hoist is positioned, and configured to capture an image of the hoist; and
an optical control system configured to:
detect one or more objects in the captured image, the one or more objects selected from: the rope, the hoist drum, a wrap of rope on the hoist drum and a marker on the hoist;
analyze the one or more detected objects; and
determine a condition of a crane component based on the analysis of the one or more detected objects,
wherein a detected object of the one or more detected objects is the one or more wraps of rope on the hoist drum,
wherein the one or more detected wraps of rope on the hoist drum are analyzed to count a number of wraps of rope on the hoist drum,
wherein the determined condition of a crane component is one or more of: an amount of rope payed out or unwound from the hoist drum, a hook block height, anti-two block, hoist drum direction of movement, current layer or last layer of the rope on the hoist drum, hoist drum winding or unwinding speed, hoist drum movement, and wherein the determined condition is determined based on the number of wraps of rope detected on the hoist drum.

11. The optical detection system of claim 10, wherein the optical control system analyzes the one or more detected objects to detect edges and determine a parallelness of the edges of one or more of wraps of the rope, strands of the rope or wires of the strand.

12. The optical detection system of claim 10, wherein the optical control system analyzes the one or more detected objects to identify a number of pixels extending across a width of the one or more detected objects.

13. The optical detection system of claim 10, wherein the optical control system analyzes the one or more detected objects to identify a marker and retrieves information associated with the marker.

14. A method of determining a condition of a crane component comprising:
capturing, with an image capture assembly, an image of a hoist on a crane;
detecting, with an optical control system, one or more objects in the captured image, wherein the one or more objects include: the hoist, a hoist drum, a rope configured to be wound or unwound on the hoist drum, and one or more wraps of the rope on the hoist drum;
analyzing, with the optical control system, the detected objects; and
determining, with the optical control system, a condition of a crane component based on the analysis of the detected objects,
wherein a detected object of the one or more detected objects is the one or more wraps of rope on the hoist drum,
wherein the one or more detected wraps of rope on the hoist drum are analyzed to count a number of wraps of rope on the hoist drum,
wherein the determined condition of a crane component is one or more of: an amount of rope payed out or unwound from the hoist drum, a hook block height, anti-two block, hoist drum direction of movement, current layer or last layer of the rope on the hoist drum, hoist drum winding or unwinding speed, hoist drum movement, and
wherein the determined condition is determined based on the number of wraps of rope detected on the hoist drum.

15. The method of claim 14, wherein the detecting one or more objects further includes detecting a marker on the hoist.

16. The method claim 15, wherein the analyzing the detected objects further includes one or more of: identifying edges of the rope, one or more strands of the rope and one or more wires of the strand and determining a parallelness of the detected edges, identifying a number of pixels extending across a width of one or more of the detected objects, identifying a direction of lay of the rope, and identifying the marker and retrieving information associated with the marker.

17. The method of claim 14, wherein a detected object of the one or more detected objects further includes one or more of the rope, the hoist and the marker, and wherein the determined condition of the crane component is further selected from one or more of: hoist erratic winding of the rope, rope pull through, diving or bury on the hoist drum, rope climbing on the hoist drum; rope wrap tightness on the hoist drum; reverse wrapping of the rope, rope type including lay type, loss of tension in the rope, and rope damage or wear.

18. The method of claim 14, wherein the method further comprises generating a signal in response to the condition of the crane component.

* * * * *

UNITED STATES PATENT AND TRADEMARK OFFICE
CERTIFICATE OF CORRECTION

PATENT NO. : 10,717,631 B2
APPLICATION NO. : 15/819171
DATED : July 21, 2020
INVENTOR(S) : John R. Rudy et al.

Page 1 of 1

It is certified that error appears in the above-identified patent and that said Letters Patent is hereby corrected as shown below:

In the Claims

1. In Column 22, Line 55, in Claim 17, delete "rope, rope pull" and insert -- rope, rope size, rope pull --, therefor.

Signed and Sealed this
Tenth Day of November, 2020

Andrei Iancu
*Director of the United States Patent and Trademark Office*